(12) United States Patent
Calin et al.

(10) Patent No.: US 10,080,229 B2
(45) Date of Patent: Sep. 18, 2018

(54) HYBRID WIRELESS COMMUNICATION SYSTEM

(71) Applicants: Doru Calin, Manalapan, NJ (US);
Aliye O. Kaya, Chatham, NJ (US);
Harish Viswanathan, Morristown, NJ (US)

(72) Inventors: Doru Calin, Manalapan, NJ (US);
Aliye O. Kaya, Chatham, NJ (US);
Harish Viswanathan, Morristown, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 118 days.

(21) Appl. No.: 15/130,145

(22) Filed: Apr. 15, 2016

(65) Prior Publication Data
US 2017/0303278 A1    Oct. 19, 2017

(51) Int. Cl.
*H04W 72/00*    (2009.01)
*H04W 72/04*    (2009.01)
(Continued)

(52) U.S. Cl.
CPC ...... *H04W 72/0453* (2013.01); *H04B 7/0617* (2013.01); *H04B 17/318* (2015.01);
(Continued)

(58) Field of Classification Search
CPC ........... H04W 72/0453; H04W 72/085; H04W 84/042; H04W 84/12; H04W 88/08;
(Continued)

(56) References Cited

U.S. PATENT DOCUMENTS

2004/0132466 A1    7/2004    Kennedy, Jr.
2011/0274001 A1    11/2011    Chin et al.
(Continued)

FOREIGN PATENT DOCUMENTS

EP    0 959 600 A1    11/1999

OTHER PUBLICATIONS

International Search Report and Written Opinion for corresponding application PCT/2017/025671, dated Aug. 9, 2017—11 pages.

*Primary Examiner* — Barry W Taylor
(74) *Attorney, Agent, or Firm* — Tong, Rea, Bentley & Kim, LLC

(57) ABSTRACT

The present disclosure generally discloses a hybrid wireless communication system configured to support wireless broadband connectivity for a geographic region including a set of wireless network access devices configured to support wireless communications by a set of communication gateways disposed at locations within the geographic region. The hybrid wireless communication system may be configured to operate across a set of multiple radio spectrum bands associated with a set of multiple carrier frequencies, respectively. The hybrid wireless communication system may be configured to jointly determine assignment of the locations (and, thus, the associated communication gateways) to the multiple carrier frequencies of the multiple radio spectrum bands and to configure the wireless network access devices to support the jointly determined assignment of the locations to the multiple carrier frequencies of the multiple radio spectrum bands.

19 Claims, 15 Drawing Sheets

(51) Int. Cl.
    *H04B 17/318* (2015.01)
    *H04B 17/336* (2015.01)
    *H04B 7/06* (2006.01)
    *H04L 5/00* (2006.01)
    *H04W 72/08* (2009.01)
    *H04W 4/04* (2009.01)
    *H04W 40/20* (2009.01)
    *H04W 84/04* (2009.01)
    *H04W 84/12* (2009.01)
    *H04W 88/08* (2009.01)
    *H04W 88/12* (2009.01)
    *H04W 88/16* (2009.01)

(52) U.S. Cl.
    CPC ........... *H04B 17/336* (2015.01); *H04L 5/005* (2013.01); *H04W 4/04* (2013.01); *H04W 40/20* (2013.01); *H04W 72/085* (2013.01); *H04W 84/042* (2013.01); *H04W 84/12* (2013.01); *H04W 88/08* (2013.01); *H04W 88/12* (2013.01); *H04W 88/16* (2013.01)

(58) Field of Classification Search
    CPC .... H04W 88/12; H04W 88/16; H04B 17/318; H04B 17/336; H04B 7/0617; H04L 5/005
    See application file for complete search history.

(56) References Cited

U.S. PATENT DOCUMENTS

| | | | |
|---|---|---|---|
| 2013/0083722 A1* | 4/2013 | Bhargava | H04W 48/20 370/315 |
| 2015/0264600 A1* | 9/2015 | Gunasekara | H04W 76/025 455/436 |
| 2016/0006837 A1* | 1/2016 | Reynolds | H04W 84/18 709/203 |

* cited by examiner

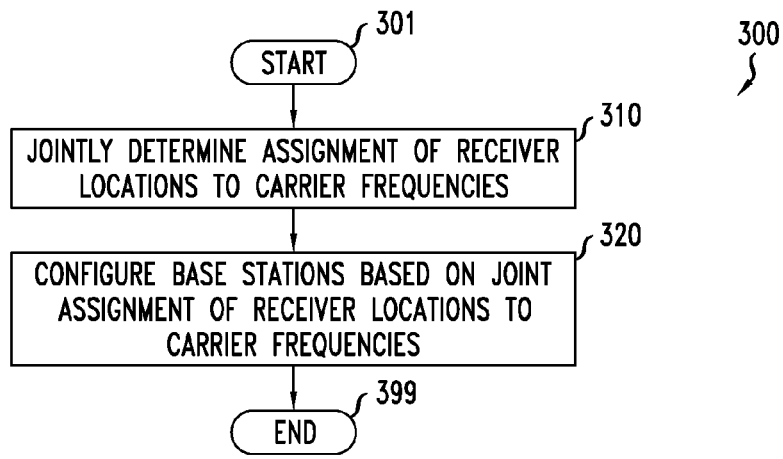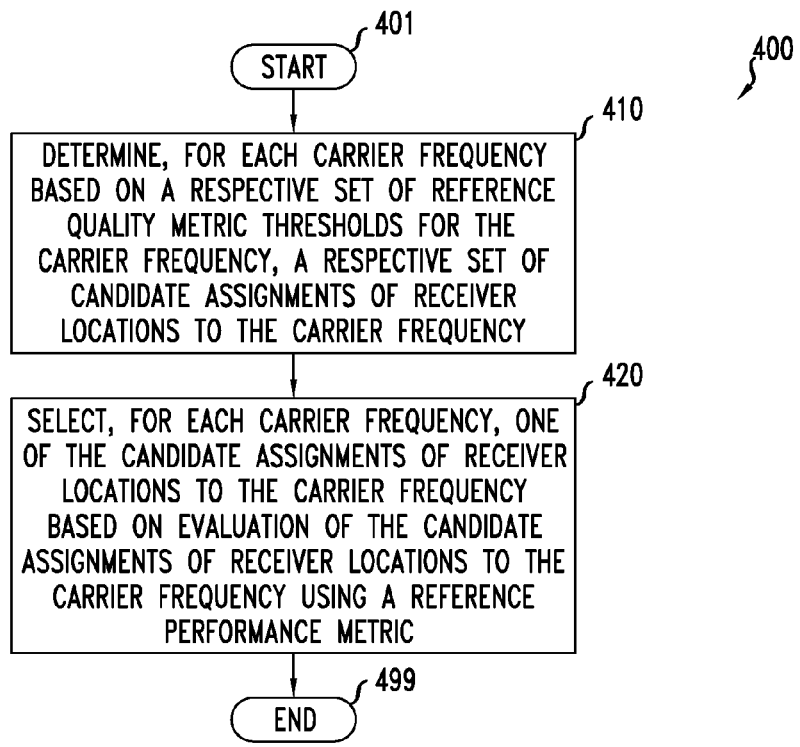

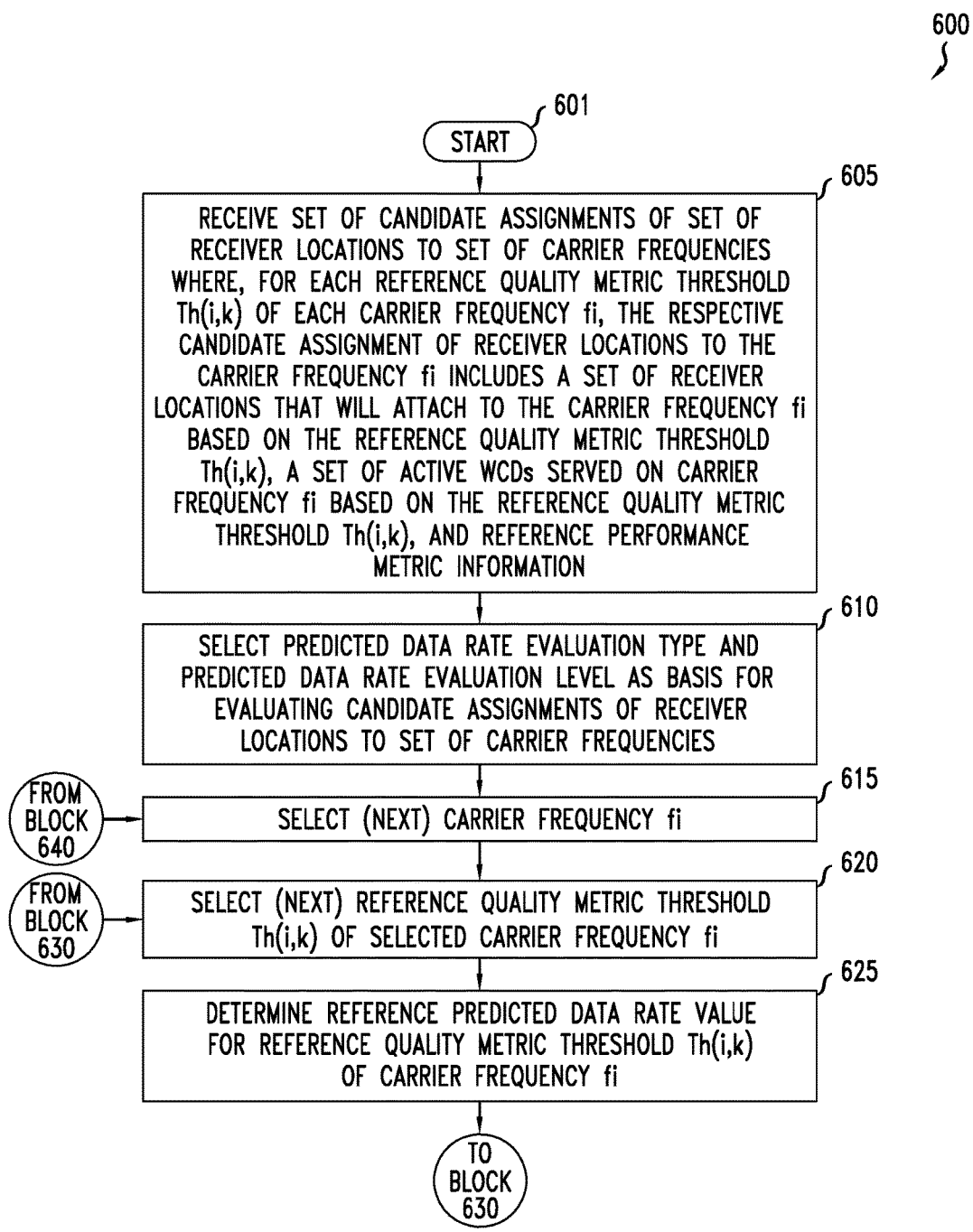

HYBRID WIRELESS COMMUNICATION SYSTEM

TECHNICAL FIELD

The disclosure relates generally to the field of communication systems and, more particularly but not exclusively, to wireless communication systems.

BACKGROUND

Various wireline technologies are currently being used to provide broadband connectivity to indoor premises (e.g., homes and enterprises). For example, many indoor premises currently receive broadband connectivity via cable networks, fiber optic networks, or the like. Disadvantageously, however, use of such wireline technologies involves significant preparation and deployment costs (e.g., for bringing optical fiber to premises requiring broadband connectivity, such as each house in a neighborhood). Additionally, unlicensed Wi-Fi and licensed femtocell deployments also depend on wiring of the premises.

SUMMARY

The disclosure generally discloses a hybrid wireless communication system configured to support wireless broadband connectivity.

In at least some embodiments, a gateway apparatus includes a first interface configured to support communications of an end-user device which are in a first protocol, a second interface configured to support wireless communications, which are in a second protocol, using a set of carrier frequencies including a first carrier frequency and a second carrier frequency, and a processor communicatively connected to the first interface and the second interface. The processor is configured to detect a first wireless signal from a wireless network access device received over the first carrier frequency. The processor is configured to propagate through the second interface, toward the wireless network access device, a first quality measurement associated with the first wireless signal. The processor is configured to detect a second wireless signal from the wireless network access device received over the second carrier frequency. The processor is configured to propagate through the second interface, toward the wireless network access device, a second quality measurement associated with the second wireless signal. The processor is configured to convert communications of the end-user device received through the first interface which are in the first protocol to wireless communications which are in the second protocol.

In at least some embodiments, a wireless network access device includes an interface configured to support wireless communications using a set of carrier frequencies including a first carrier frequency and a second carrier frequency and a processor communicatively connected to the interface. The processor is configured to activate a first wireless signal at a location, through the interface, using the first carrier frequency. The processor is configured to receive, from a gateway at the location, a first quality measurement associated with the first wireless signal activated at the location using the first carrier frequency. The processor is configured to activate a second wireless signal at the location, through the interface, using the second carrier frequency. The processor is configured to receive, from the gateway at the location, a second quality measurement associated with the second wireless signal activated at the location using the second carrier frequency.

In at least some embodiments, an apparatus includes a processor and a memory communicatively connected to the processor. The processor is configured to determine an assignment of a set of locations of a geographic region to a set of carrier frequencies including a first carrier frequency and a second carrier frequency. The processor is configured to determine, based on the assignment of the set of locations to the set of carrier frequencies, wireless network access device configuration information for a wireless network access device associated with the geographic region, wherein the wireless network access device configuration information is adapted for configuring the wireless network access device to support wireless communications using the first carrier frequency and the second carrier frequency. The processor is configured to propagate, toward the wireless network access device, a message including the wireless network access device configuration information.

BRIEF DESCRIPTION OF THE DRAWINGS

The teachings herein can be readily understood by considering the following detailed description in conjunction with the accompanying drawings, in which:

FIG. 3 depicts an embodiment of a method for configuring base stations to support broadband connectivity for a set of receiver locations;

FIG. 4 depicts an embodiment of a method for jointly determining assignment of receiver locations to carrier frequencies;

FIGS. 6A and 6B depict an embodiment of a method for evaluating candidate assignments of receiver locations to carrier frequencies based on a reference performance metric;

DETAILED DESCRIPTION

Figure 1:
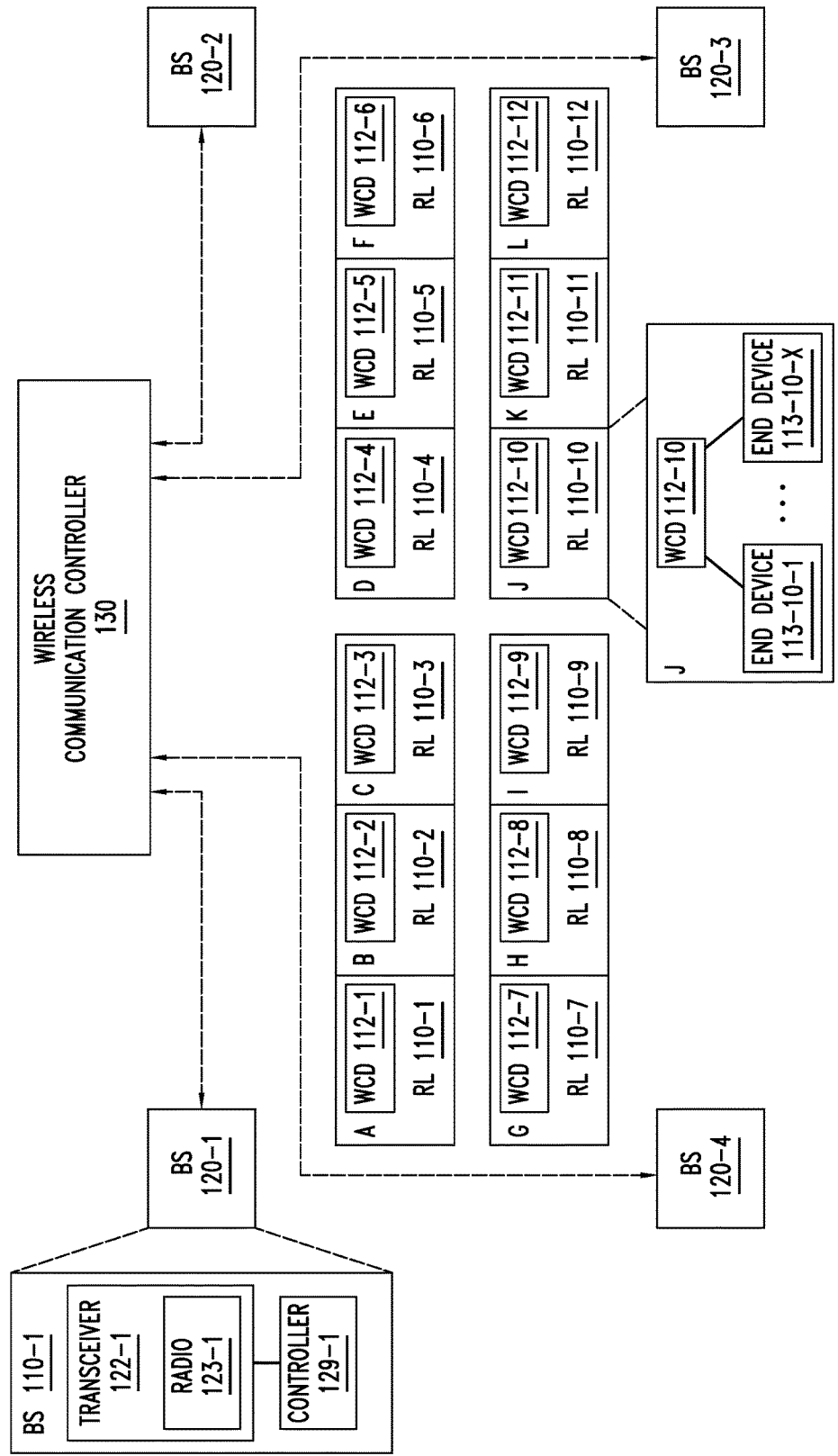
FIG. 1 depicts a hybrid wireless communication system configured to support broadband connectivity.

The disclosure generally discloses a hybrid wireless communication system configured to support wireless broadband connectivity. The hybrid wireless communication system configured to support wireless broadband connectivity may be configured to support wireless broadband connectivity for a geographic region including a set of wireless network access devices (e.g., base stations or other suitable types of wireless network access devices) configured to support wireless communications by a set of communication gateways disposed at locations within the geographic region. The hybrid wireless communication system configured to support wireless broadband connectivity may be configured to support wireless broadband connectivity for the communication gateways at the locations within a geographic region. The hybrid wireless communication system configured to support wireless broadband connectivity may be configured to operate across a set of multiple radio spectrum bands associated with a set of multiple carrier frequencies, respectively. The multiple radio spectrum bands may include a high frequency radio spectrum band and a low frequency radio spectrum band and, similarly, the multiple carrier frequencies of the multiple radio spectrum bands may include a high frequency carrier associated with the high frequency radio spectrum band and a low frequency carrier associated with the low frequency radio spectrum band. The hybrid wireless communication system configured to support wireless broadband connectivity may be configured to jointly determine an assignment of the locations (and, thus, associated communication gateways) of the geographic region to the multiple carrier frequencies of the multiple radio spectrum bands and to configure the wireless network access devices of the geographic region to support the jointly determined assignment of the locations (and, again, associated communication gateways) of the geographic region to the multiple carrier frequencies of the multiple radio spectrum bands. Various embodiments of a hybrid wireless communication system may support various characteristics for providing improved wireless broadband connectivity for locations in a targeted geographic region, such as using two or more radio spectrum bands to provide wireless broadband connectivity in the region (where the coverage/propagation properties can be significantly different in the two or more radio spectrum bands, e.g., for supporting locations having different channel conditions within the same region), supporting configurability of the multiple radio spectrum bands (e.g., each radio spectrum band may support adjustable power levels, adjustable number of beams which are generated from antennas attached to radios serving the radio spectrum bands, adjustable reference quality metric thresholds per carrier (e.g., Received Signal Strength Indicator (RSSI), Signal to Interference and Noise Ratio (SINR), or the like), or the like), enabling devices at the locations of the targeted geographic region to connect to the radio spectrum bands (where multiple devices may be served by each band and where each device may be configured to operate either in a single radio spectrum band or in multiple radio spectrum bands simultaneously), supporting joint assignment of locations to the multiple radio spectrum bands based on reference quality metric thresholds (e.g., RSSI, SINR, or the like) associated with the radio spectrum bands, supporting joint assignment of locations to the radio spectrum bands based on one or more reference performance metrics (e.g., data rate, throughput, latency, or the like), supporting joint assignment of locations to the multiple radio spectrum bands based on a combination of one or more reference quality metrics and one or more reference performance metrics, supporting dynamic system configuration and optimization through adjustment of various parameters (e.g., adjustment of power levels, the number of beams used, reference quality metric thresholds, or the like, as well as various combinations thereof) responsive to various conditions (e.g., changes in radio conditions, changes in traffic, or the like, as well various combinations thereof), or the like, as well as various combinations thereof. The hybrid wireless communication system supporting wireless broadband connectivity may be configured to provide wireless broadband connectivity to large numbers of geographically distributed locations without requiring the use of costly wireline deployments. These and various other embodiments and potential advantages of a hybrid wireless communication system supporting wireless broadband connectivity may be further understood by way of reference to FIG. 1.

FIG. 1 depicts a hybrid wireless communication system configured to support broadband connectivity.

The hybrid wireless communication system 100 includes a set of receiver locations (RLs) 110-1-110-12 (collectively, RLs 110), a set of base stations (BSs) 120-1-120-4 (collectively, BSs 120), and a wireless communication controller (WCC) 130.

The hybrid wireless communication system 100 is configured to provide wireless broadband connectivity for the RLs 110 using a set of radio spectrum bands including one or more radio spectrum bands. The one or more radio spectrum bands each have associated therewith a carrier frequency and an associated bandwidth, respectively. In at least some embodiments, the set of radio spectrum bands includes multiple radio spectrum bands having multiple carrier frequencies associated therewith, respectively, to provide thereby a hybrid system using multiple spectrum bands and multiple carrier frequencies to provide broadband connectivity for the RLs 110.

The RLs 110 represent locations of customers which obtain broadband connectivity from a wireless broadband connectivity provider (which may be operating the BSs 120 to provide wireless broadband connectivity). The RLs 110 generally represent indoor locations, although it will be appreciated that at least some of the RLs 110 may represent outdoor locations (or a combination of both indoor and outdoor locations). For example, RLs 110 may be homes, businesses, enterprise locations, or the like. The RLs 110 are distributed over a geographic region, and each of the RLs 110 has a respective geographic location associated therewith. For purposes of clarity, FIG. 1 depicts twelve RLs 110 (denoted, for ease of reference, as receiver locations A, B, C, D, E, F, G, H, I, J, K, and L) arranged in a particular arrangement; however, it will be appreciated that fewer or more RLs 110 may be present, RLs 110 may be arranged in other arrangements, RLs 110 may be distributed over smaller or larger geographic regions, or the like, as well as various combinations thereof.

The RLs 110-1-110-12 include a set of wireless communication devices (WCDs) 112-1-112-12 (collectively, WCDs 112), respectively.

The WCDs 112 of the RLs 110 are communication gateways that are (1) configured to support wireless communications with BSs 120 and (2) configured to support communications of one or more end devices which may be located at the RLs 110, respectively.

The WCDs 112 are communication gateways configured to support wireless communications with BSs 120 to obtain wireless broadband connectivity from the BSs 120. For example, for a given WCD 112, the wireless communications by the WCD 112 with BSs 120 may include downstream wireless communications from BSs 120 to the WCD 112, upstream wireless communications from the WCD 112 to the BSs 120, or the like, as well as various combinations thereof. The wireless communications by the WCDs 112 may transport various types of content and information. For example, downstream wireless transmissions to WCDs 112 of RLs 110 may include control signals and information associated with determining and supporting assignment of RLs 110 to carrier frequencies (e.g., control signals for use by WCDs 112 in measuring and reporting signal quality for use in determining assignment of RLs 110 to carrier frequencies, configuration commands for configuring WCDs 112 based on assignment of the RLs 110 to carrier frequencies, or the like), content (e.g., broadcast television content, streaming or downloading video content, streaming or downloading audio content, streaming or downloading multimedia content, web browsing content, e-mails, social media updates, instant messages, or the like), or the like, as well as various combinations thereof. For example, upstream wireless transmissions by WCDs 120 of RLs 110 may include control signals and information associated with determining and supporting assignment of RLs 110 to carrier frequencies (e.g., signal quality measurement reports for use in determining assignment of RLs 110 to carrier frequencies or the like), content (e.g., streaming or upload video content, streaming or upload audio content, streaming or upload multimedia content, web browsing requests, e-mails, social media updates, instant messages, or the like), or the like, as well as various combinations thereof. It will be appreciated that the WCDs 112 may be configured to support various other types of wireless communications for RLs 110 in order to provide wireless broadband connectivity for the RLs 110.

The WCDs 112 are configured to support wireless communications for RLs 110 using various wireless communications technologies. For example, the WCDs 112 may be configured to support wireless communications for RLs 110 using various types of wireless access technologies (e.g., cellular, WiMAX, or the like) between the WCDs 112 and the BSs 120. For example, where the WCDs 112 are configured to support wireless communications with BSs 120 using cellular wireless access, the WCDs 112 may be configured to support Third Generation (3G) cellular wireless access technologies, Fourth Generation (4G) cellular wireless access technologies (e.g., Long Term Evolution (LTE) or the like), Fifth Generation (5G) cellular wireless access technologies, or the like. For example, the WCDs 112 may be configured to support wireless communications for RLs 110 using various types of wireless communication protocols which may be supported by or used with the wireless access technologies being used between the WCDs 112 and the BSs 120 (e.g., cellular protocols or other suitable types of protocols). The WCDs 112 may be configured to support wireless communications for RLs 110 using various other wireless communications technologies.

The WCDs 112 are configured to support wireless communications with BSs 120 using a set of carrier frequencies $f_i$ being used within the geographic region. It will be appreciated that each WCD 112 within the geographic region may be configured to support all of carrier frequencies $f_i$ being used in the geographic region, one or more of the WCDs 112 may be configured to support only a subset of the carrier frequencies $f_i$ being used in the geographic region, or the like, as well as various combinations thereof.

The WCDs 112 of the RLs 110 are communication gateways configured to support communications of one or more end devices which may be located at the RLs 110, respectively. For purposes of clarity, only WCD 112-10 of RL 110-10 is depicted as supporting a set of end devices 113-10-1-113-10-X (collectively, end devices 113-10); however, it will be appreciated that each of the other WCDs 112 also may support one or more end devices 113, respectively. The end devices 113 supported by a WCD 112 may include various types of devices which may be located at RLs 110 (e.g., routers, set-top boxes, televisions, desktop computers, laptop computers, tablet computers, smartphones, smart appliances, IoT devices, or the like). It will be appreciated that the end devices 113 supported by a WCD 112 may communicate with the WCD 112 using wired or wireless communications (e.g., WCD 112 may support one or more wired communication interfaces and one or more wireless communication interfaces). For example, the WCDs 112 may be configured to support various communication technologies for communications with the end devices 113 (e.g., Ethernet, Wi-Fi, Bluetooth, Zigbee, or the like, as well as various combinations thereof). For example, the WCDs 112 may be configured to support various communication protocols for communications with the end devices 113 (e.g., Ethernet protocols, Wi-Fi protocols, Bluetooth protocols, Zigbee protocols, or the like). The end devices 113 also may be referred to herein as end-user devices 113.

The WCDs 112, as discussed above, are configured to operate as gateways between the end devices 113 and the BSs 120. The interfaces between the WCDs 112 and the end devices 113 and the interfaces between the WCDs 112 and the BSs 120 may utilize various types of communication technologies and various associated types of communication protocols and, thus, the WCDs 112 may be configured to perform various communication protocol conversions for traffic of the end devices 113. For example, for downstream communications in a direction from the BSs 120 toward a given WCD 112, the WCD 112 may be configured to convert the downstream communications from the wireless communication protocol used between the BSs 120 and the WCD 112 and the local communication protocol(s) used between the WCD 112 and the end device(s) for which the downstream communications are intended. For example, for upstream communications in a direction from a given WCD 112 toward the BSs, the WCD 112 may be configured to convert the upstream communications from the local communication protocol(s) used between the WCD 112 and the end device(s) from which the upstream communications originate and the wireless communication protocol used between the BSs 120 and the WCD 112.

It is noted that, for purposes of clarity, FIG. 1 depicts twelve WCDs 112 for the twelve RLs 110; however, it will be appreciated that one or more of the RLs 110 may include multiple WCDs 112, one or more of the RLs 110 may not include a WCD 112 (e.g., one or more devices at the RL 110 may receive wireless broadband connectivity directly), or the like, as well as various combinations thereof.

The BSs 120 are configured to provide wireless broadband connectivity for the RLs 110, which are located in the geographic region in which the BSs 120 are deployed.

The BS 120 may be deployed in various ways in order to provide wireless broadband connectivity for the RLs 110. The BSs 120 may be deployed at various geographic locations relative to the RLs 110. The BSs 120 may be deployed at outdoor locations using various types of urban or suburban infrastructure equipped with electricity (e.g., on electric/telephone poles, street light poles, towers, buildings, or the like). The exact deployment of the BSs 120 (e.g., number of BSs 120 deployed, locations at which the BSs 120 are deployed (which may include geographic locations as well as height), density of BSs 120 deployed, and so forth) may be determined through intelligent system design which may be based on various factors (e.g., density of RLs 110 to be served, capacity requirements of the RLs 110, desirable site-to-site distance to meet various requirements (e.g., coverage requirements, capacity requirements, or the like), or the like, as well as various combinations thereof). For purposes of clarity, FIG. 1 depicts four BSs 120 (denoted, for ease of reference, as base stations BS1, BS2, BS3, and BS4) arranged in a particular arrangement; however, it will be appreciated that fewer or more BSs 120 may be deployed to support wireless communications for the RLs 110, the BS 120 deployed to support wireless communications for the RLs 110 may be deployed in various other ways (e.g., at other geographic locations, at other relative locations with respect to each other, or the like), or the like, as well as various combinations thereof. While FIG. 1 depicts four BSs 120 (again, for purposes of clarity), the number of base stations providing wireless service for a geographical region is referred to more generally herein using B.

The BSs 120 are configured to support wireless communications for RLs 110 in order to provide wireless broadband connectivity for the RLs 110. For example, the BSs 120 may be configured to support downstream wireless transmissions to WCDs 112 of RLs 110, upstream wireless transmissions by WCDs 120 of RLs 110, or the like, as well as various combinations thereof. The wireless communications for RLs 110 that are supported by BSs 120 may transport various types of content and information. For example, downstream wireless transmissions to WCDs 112 of RLs 110 may include control signals and information associated with determining and supporting assignment of RLs 110 to carrier frequencies (e.g., control signals for use by WCDs 112 in measuring and reporting signal quality for use in determining assignment of RLs 110 to carrier frequencies, configuration commands for configuring WCDs 112 based on assignment of the RLs 110 to carrier frequencies, or the like), content (e.g., broadcast television content, streaming or downloading video content, streaming or downloading audio content, streaming or downloading multimedia content, web browsing content, e-mails, social media updates, instant messages, or the like), or the like, as well as various combinations thereof. For example, upstream wireless transmissions by WCDs 120 of RLs 110 may include control signals and information associated with determining and supporting assignment of RLs 110 to carrier frequencies (e.g., signal quality measurement reports for use in determining assignment of RLs 110 to carrier frequencies or the like), content (e.g., streaming or upload video content, streaming or upload audio content, streaming or upload multimedia content, web browsing requests, e-mails, social media updates, instant messages, or the like), or the like, as well as various combinations thereof. It will be appreciated that the BSs 120 may be configured to support various other types of wireless communications for RLs 110 in order to provide wireless broadband connectivity for the RLs 110.

The BSs 120 are configured to support wireless communications for RLs 110 using various wireless communications technologies. For example, the BSs 120 may be configured to support wireless communications for RLs 110 using various types of wireless access technologies (e.g., cellular, WiMAX, or the like). For example, where the BSs 120 are configured to support wireless communications for RLs 110 using cellular wireless access, the BSs 120 may be configured to support 3G cellular wireless access technologies, 4G cellular wireless access technologies (e.g., LTE or the like), 5G cellular wireless access technologies, or the like). For example, the BSs 120 may be configured to support wireless communications for RLs 110 using various types of wireless communication protocols which may be supported by or used with the wireless access technologies being used. The BSs 120 may be configured to support wireless communications for RLs 110 using various other wireless communications technologies.

The BSs 120 are configured to support wireless communications for RLs 110 in order to provide wireless broadband connectivity for the RLs 110 using a set of radio spectrum bands including one or more radio spectrum bands. In at least some embodiments, the BSs 120 are configured to support wireless communications for RLs 110 using a hybrid configuration in which the set of radio spectrum bands includes two or more radio spectrum bands. In at least some embodiments, the BSs 120 are configured to support wireless communications for RLs 110 using a hybrid configuration in which the set of radio spectrum bands includes two radio spectrum bands. In at least some embodiments, for example, in which the BSs 120 are configured to support wireless communications for RLs 110 using a hybrid configuration in which the set of radio spectrum bands includes two radio spectrum bands, the two radio spectrum bands may include a low radio spectrum band (centered at a low carrier frequency and having a total available bandwidth denoted as BW_L) and a high radio spectrum band (centered at a high carrier frequency and having a total available bandwidth denoted as BW_H). In at least some embodiments, for example, in which the BSs 120 are configured to support wireless communications for RLs 110 using a hybrid configuration in which the set of radio spectrum bands includes two radio spectrum bands, the two radio spectrum bands may include a low carrier frequency that is centered at or near 3.5 GHz and that has approximately 40 MHz of spectrum available and a high carrier frequency that is centered at or near 28 GHz and that has approximately 250 MHz of spectrum available. It will be appreciated that the radio spectrum bands may be defined in other portions of radio spectrum. For example, in at least some embodiments, the low carrier frequency may be centered at or near 5 GHz or at or near some other suitable radio spectrum location. For example, in at least some embodiments, the high carrier frequency may be centered at or near 37 GHz, at or near 39 GHz, at or near 60 GHz, at or near 71 GHz, or at or near some other suitable radio spectrum location. It will be appreciated that various combinations of radio spectrum locations may be used.

The BSs 120, as discussed above, may be configured to support wireless communications for RLs 110 using a hybrid configuration in which the set of radio spectrum bands includes a high radio spectrum band (centered at a high carrier frequency and having a total available bandwidth denoted as BW_H) and a low radio spectrum band (centered at a low carrier frequency and having a total available bandwidth denoted as BW_L). The use of a hybrid configuration, using a combination of the high radio spectrum band and the low radio spectrum band to provide wireless broadband connectivity over a geographic region, provides various improvements in wireless broadband connectivity for locations within the geographic region. The use of the high radio spectrum band is expected to provide high to very high data rates (hundreds of Mbps to Gbps) to WCDs present at locations which enjoy average radio conditions (e.g., reflected in the median data rate of the Cumulative Distribution Function (CDF) of data rates) and good radio conditions. However, it is known that the high radio spectrum band is typically used for shorter range wireless communications, as higher carrier frequencies typically do not propagate well through lossy environments (e.g., through trees in the street, through building walls, and so forth). Accordingly, it is beneficial to supplement use of the high radio spectrum band with use of the low radio spectrum band. The use of the low radio spectrum band is expected to provide sufficiently high data rates (tens to hundreds of Mbps) to WCDs present at locations corresponding to more challenged radio conditions, due to their better propagation properties through lossy environments. This may relax the constraint on the site-to-site distance, which makes use of such a hybrid multi-carrier wireless system more economically attractive. In other words, the hybrid multi-carrier wireless system is configured to leverage a combination of the strengths of the high and low spectrum bands together to provide an ultra-broadband wireless system that meets the high expectations for coverage, capacity, and user experience.

The BSs 120, as discussed further below, may include various types of elements configured for use in supporting wireless communications for RLs 110 in order to provide wireless broadband connectivity for the RLs 110. For example, as discussed further below, each BS 120 may include one or more antennas, one or more transceivers, one or more radios, one or more controllers, one or more support circuits, one or more power sources, or the like, as well as various combinations thereof.

The BSs 120, as illustrated by BS 120-1 (but omitted from BSs 120-2-120-4 for purposes of clarity), each include a set of one or more wireless transceivers 122 (a single wireless transceiver 122-1 is depicted for purposes of clarity). The wireless transceivers 122, as illustrated by BS 120-1, each include a set of one or more radios 123 (a single radio 123-1 is depicted for purposes of clarity). It will be appreciated that each of the radios 123 may be configured to support at least one carrier frequency. The set of radios 123 of the BSs 120 serving the RLs 110 may be configured to support a set of one or more carrier frequencies for the RLs 110. The set of one or more carrier frequencies for the RLs 110 may be supported by the radios 123 of the wireless transceivers 122 of the BSs 120 in various ways. For example, the set of one or more carrier frequencies for the RLs 110 may include a single carrier frequency and each of the BSs 120 is configured to support that single carrier frequency. For example, the set of one or more carrier frequencies for the RLs 110 may include two carrier frequencies and each of the BSs 120 is configured to support only one or other of the two carrier frequencies (with at least one BS 120 supporting each of the two carrier frequencies such that the combination of the set of BSs 120 is configured to support the two carrier frequencies). For example, the set of one or more carrier frequencies for the RLs 110 may include two carrier frequencies and each of the BSs 120 may be configured to support both of the carrier frequencies. For example, the set of one or more carrier frequencies for the RLs 110 may include two carrier frequencies and each of the BSs 120 may be configured to support only one of the carrier frequencies or both of the carrier frequencies (e.g., there is a mix of single-band BSs 120 and dual-band BSs 120). It will be appreciated that more than two carrier frequencies may be used to provide wireless broadband connectivity within a geographic region. It will be appreciated that, in the case in which a given BS 120 supports two or more carrier frequencies, the two or more carrier frequencies may be supported using one or more wireless transceivers, one or more radios (e.g., using single-band radios, dual-band radios, or the like), or the like, as well as various combinations thereof.

The BSs 120 are configured to use wireless beams to support wireless communications by WCDs 112 at RLs 110.

The radios 123 of the wireless transceivers 122 of the BSs 120 are configured to provide wireless beams which may be used to support wireless communications of WCDs 112 at RLs 110. In general, each radio 123, for a given carrier frequency fi, is capable of creating at least one directional beam for the carrier frequency fi. In at least some embodiments, each radio 123, operating on carrier frequency fi can form Ni independent directional beams with certain characteristics, such as directivity gains G(i,j) for the j-th beam and angular width A(i,j) for the j-th beam, where $1 \leq j \leq Ni$. The beams may point in different directions, and each beam can cover a specific geographic area when active/illuminated. In at least some embodiments, while operating a radio at the carrier frequency fi, a number of beams Mi out of the total number of beams Ni, ($1 \leq Mi \leq Ni$), can be simultaneously active at a given time. The number of simultaneously active beams can fluctuate over time and can be specific to each BS 120 (or wireless transceiver 122), i.e. Mi(b), where $1 \leq b \leq B$ is the index of the BS 120. In general, at any given moment, the beam characteristics can be specific to each BS 120 (wireless transceiver 122) and, further, can differ from beam to beam, from carrier frequency to carrier frequency, and from BS 120 (wireless transceiver 122) to BS 120 (wireless transceiver 122), where G(i,j,Mi(b),b) and A(i,j,Mi(b),b) show this full dependency. The manner in which the radios 123 of the wireless transceivers 122 of the BSs 120 may provide the wireless beams in order to support wireless communications of WCDs 112 at RLs 110 will be understood by one skilled in the art.

The wireless transceivers 122 of the BSs 120 are configured to transmit using the wireless beams to support wireless communications by WCDs 112 at RLs 110. In general, a wireless transceiver 122 is configured to transmit at a power level Pi through the radio 123 operating at the carrier frequency fi. It will be appreciated that the power level Pi may be distributed across all the simultaneously active beams, either equally or with different values (more power radiated on certain beams at the expense of other beams). In general, a wireless transceiver 122 may be configured to perform beam steering. That is, the active beams can be spatially steered over time to ensure desirable wireless coverage around the transmitter (e.g., 180°, 360°, or the like). For instance, if Mi=1, only one beam out of the total Ni beams of carrier frequency fi is illuminated at a given time Ti. In at least some embodiments, the steering across beams can be done in a round robin manner (the time spent illuminating the beam B(i,k,Mi(b),b) on carrier frequency fi with Mi(b) simultaneously active beams on the b-th BS, T(i,k,Mi(b),b), is equal to the time spent illuminating beam B(i,k,Mi(b),b) on carrier frequency fi with Mi(b) simultaneously active beams on the b-th BS, T(i,k,Mi(b),b)). It is noted that the use of round robin beam steering may be suitable under various conditions, such as when the WCDs/traffic are/is uniformly distributed within the area served by a transceiver 122. In at least some embodiments, the amount of time that beams are illuminated may vary across beams (e.g., the time spent illuminating the beam B(i,k,Mi(b),b) on carrier frequency fi with Mi(b) simultaneously active beams on the b-th BS, T(i,k,Mi(b),b)), is shorter or longer than the time spent illuminating beam B(i,l,Mi(b),b) on carrier frequency fi with Mi(b) simultaneously active beams on the b-th BS, T(i,l,Mi)b),b)). It is noted that the use of non-uniform beam illumination times may be suitable when the WCDs/traffic are/is distributed non-uniformly within the area served by a transceiver 122, and more time is required to serve areas of higher traffic density. The beam steering that is performed also may include controlling the spatial orientation of the direction of the beam in azimuth Az(i,j, Mi(b),b) and tilt Tilt(i,j,Mi(b),b) in order to more efficiently focus the energy of the beam. In at least some embodiments, one or more of the BSs 120 may be configured to use more sophisticated beam steering 120 (e.g., controlling one or more of the numbers of beams used, one or more characteristics of beams used (e.g., power, time illuminated, size, spatial orientation, or the like), or the like, as well various combinations thereof) such that any beam may be controlled in any manner to illuminate any geographic area covered by the respective transceiver 122 (which may include one or more RLs 110) in any suitable manner. It will be appreciated that RLs 110 falling within the coverage area of a particular beam of a BS 120 are served when the beam is illuminated and, therefore, that beam steering may be performed in various ways to provide wireless coverage for all or part of the geographic area surrounding the BS 120. The manner in which the wireless transceivers 122 of the BSs 120 may control the wireless beams in order to support wireless communications of WCDs 112 at RLs 110 will be understood by one skilled in the art.

The BSs 120, as discussed above, may be configured to support one or more carrier frequencies to provide wireless broadband connectivity for the RLs 110. In at least some embodiments, as primarily presented herein, the BSs 120 may be configured to provide a hybrid system which operates on two carrier frequencies. In at least some embodiments, the hybrid system may use a low carrier frequency (within the low radio spectrum band) with total available bandwidth BW_L and a high carrier frequency (within the high radio spectrum band) with total available bandwidth BW_H. In at least some embodiments, for a hybrid system using a high carrier frequency f1 and a low carrier frequency f2, there may be: (1) N1 beams for the high carrier frequency f1, characterized by directivity gain G1j and angular width A1j, (1≤j≤N1), where M1 beams out of the total N1 beams can be simultaneously active on the high carrier frequency f1, and the power level P1 is distributed across the M1 beams that are simultaneously active at a given time and (2) N2 beams for the low carrier frequency f2, characterized by directivity gain G2j and angular width A2j (1≤j≤N2), where M2 beams out of the total N2 beams can be simultaneously active on the low carrier frequency f2 and the power level P2 is distributed across the M2 beams that are simultaneously active at a given time. It will be appreciated that, as noted above, the direction of each beam can be dynamically adjusted in azimuth Az(i,j,Mi(b),b) and tilt Tilt(i,j,Mi(b),b) in order to more efficiently focus the energy of the beams to absorb traffic demands. It will be appreciated that the foregoing description of the beams provided by the BSs 120 in a hybrid system using two carrier frequencies is merely one example of the manner in which the beams may be provided by the BSs 120 in a hybrid system using two carrier frequencies (again, beams provided by the BSs 120 may be provided in various ways to provide wireless broadband connectivity for the RLs 110). It also will be appreciated that beams provided by the BSs 120 may be provided in various other ways in order to provide wireless broadband connectivity for the RLs 110 where fewer or more carrier frequencies are used).

The BSs 120 may be dynamically configured in order to provide wireless broadband connectivity for the RLs 110. The BSs 120 may be dynamically configured, based on joint assignment of the RLs 110 to the carrier frequencies in the set of carrier frequencies, at various levels of granularity in order to provide wireless broadband connectivity for the RLs 110. In at least some embodiments, for example, the BSs 120 may be configured to provide beams in a manner for illuminating each of the RLs 110 and the dynamic configuration of the BSs 120 may primarily include setting one or more parameters of the carrier frequencies used by the BSs 120 (e.g., per-carrier reference quality metric thresholds for the respective carrier frequencies) and, optionally, one or more additional parameters which may be determined based on the one or more parameters of the carrier frequencies used by the BSs 120 (e.g., number of beams used by each BS 120, transmit power per beam used by each BS 120, or the like, as well as various combinations thereof). In at least some embodiments, for example, the dynamic configuration of the BSs 120 may include fine-grained configuration of the BSs 120 to dynamically control illumination of each of the RLs 110 (e.g., activating and deactivating beams used by each BS 120, setting power levels of the beams used by each BS 120, setting gains of the beams used by each BS 120, setting directions of the beams used by each BS 120 (e.g., azimuth and tilt), setting width of the beams used by each BS 120, activating and deactivating use of carrier frequencies, setting and modifying per-carrier reference quality metric thresholds associated with carrier frequencies, or the like, as well as various combinations thereof). The dynamic configuration of BSs 120 in order to provide wireless broadband connectivity for the RLs 110 is discussed further below.

The BSs 120 may be configured to provide various other functions for supporting wireless communications of WCDs 112 of RLs 110.

The WCC 130 may be configured to provide various control functions in order to provide wireless broadband connectivity for the WCDs 112 of the RLs 110.

The WCC 130 may be configured to control attachment of WCDs 112 of RLs 110 to BSs 120 in order to provide wireless broadband connectivity for the WCDs 112 of the RLs 110. The WCC 130 may be configured to control attachment of WCDs 112 of RLs 110 to BSs 120 by jointly determining assignment of RLs 110 (WCDs 112 of the RLs 110) to carrier frequencies supported by the BSs 120 (and, optionally, to specific BSs 120 or specific beams of specific BSs 120) and controlling configuration of the BSs 120 to provide the jointly determined assignment of the RLs 110 (WCDs 112 of the RLs 110) to the carrier frequencies supported by the BSs 120 (and, optionally, to specific BSs 120 or specific beams of specific BSs 120). It is noted that an exemplary embodiment of a method for controlling attachment of WCDs 112 of RLs 110 to BSs 120 in order to provide wireless broadband connectivity for the WCDs 112 of the RLs 110 is presented with respect to FIG. 3.

The WCC 130 may be configured to jointly determine assignment of RLs 110 (WCDs 112 of the RLs 110) to carrier frequencies supported by the BSs 120 (and, optionally, to specific BSs 120 or specific beams of specific BSs 120). The WCC 130 may be configured to jointly determine assignment of RLs 110 (WCDs 112 of the RLs 110) to carrier frequencies supported by the BSs 120 by (1) determining, for each of the carrier frequencies supported by the BSs 120, a set of candidate assignments of the RLs 110 to the carrier frequency based on respective sets of reference quality metric thresholds (for a reference quality metric, such as RSSI, SINR, or the like) associated with the carrier frequency (an exemplary embodiment of which is presented with respect to FIG. 5) and (2) selecting, for each of the carrier frequencies, one of the candidate assignments of the RLs 110 to the respective carrier frequency based on evaluation of the candidate assignments of the RLs 110 to the respective carrier frequency using a reference performance metric (an exemplary embodiment of which is depicted with respect to FIG. 6).

The WCC 130 may be configured to control configuration of the BSs 120 based on the jointly determined assignment of the RLs 110 (WCDs 112 of the RLs 110) to the carrier frequencies supported by the BSs 120 (and, optionally, to specific BSs 120 or specific beams of specific BSs 120), which, in at least some embodiments, also may be considered to be controlling attachment of WCDs 112 of RLs 110 to BSs 120 in order to provide wireless broadband connectivity for the WCDs 112 of RLs 110.

The WCC 130 may be configured to control configuration of the BSs 120 based on the jointly determined assignment of the RLs 110 (WCDs 112 of the RLs 110) to the carrier frequencies supported by the BSs 120 by determining BS configuration information for each of the BSs 120 and providing the BS configuration information for the BSs 120 to the BSs 120, respectively.

The WCC 130 may be configured to control configuration of the BSs 120 to attach the RLs 110 (WCDs 112 of the RLs 110) to carrier frequencies based on the jointly determined assignment of the RLs 110 (WCDs 112 of the RLs 110) to the carrier frequencies supported by the BSs 120 by determining BS configuration information for each of the BSs 120 and providing the BS configuration information for the BSs 120 to the BSs 120, respectively. The BSs 120 may then be configured based on the BS configuration information for the BSs 120, respectively, to attach the RLs 110 (WCDs 112 of the RLs 110) to carrier frequencies based on the jointly determined assignment of the RLs 110 (WCDs 112 of the RLs 110) to the carrier frequencies. For example, a BS 120 receiving BS configuration information from WCC 130 may use the BS configuration information to configure itself under the control of WCC 130.

It will be appreciated that the BS configuration information that is determined and provided to the BSs 120 may depend on the configurability of the BSs 120.

In at least some embodiments, for example, configuration of the BSs 120 based on the jointly determined assignment of the RLs 110 (WCDs 112 of the RLs 110) may not be highly configurable. In at least some embodiments, for example, the BS configuration information for configuration of the BSs 120 includes reference quality metric thresholds to be used for each of the carrier frequencies, but may not include BS assignment information indicating specific assignments of RLs 110 to specific BSs 120 (or specific beams of specific BSs 120). In at least some such embodiments, configuration of the BSs 120 may rely on beam control capabilities of the BSs 120 (e.g., each BS 120 may be pre-configured to illuminate beams according to various pre-configured beam parameters, such as by using beam sweeping around all or part of the BSs 120) and, thus, configuration of the BSs 120 based on the jointly determined assignment of the RLs 110 (WCDs 112 of the RLs 110) to the carrier frequencies supported by the BSs 120 may simply include setting the reference quality metric thresholds for the carrier frequencies on the BSs 120. For example, the BS configuration information for a BS 120 may include, for each of the carrier frequencies to be supported by the BS 120, information such as a total number of beams to be used for the carrier frequency, a total transmit power to be used for the carrier frequency, or the like, as well as various combinations thereof. It is noted that, in at least some such embodiments, even though the BS configuration information for configuration of the BSs 120 does not include specific assignments of RLs 110 to specific BSs 120 (or specific beams of specific BSs 120), each of the RLs 110 will receive broadband wireless service when the beam or beams of one or more BSs 120 illuminate the geographic regions of the RLs 110, respectively.

In at least some embodiments, for example, configuration of the BSs 120 based on the jointly determined assignment of the RLs 110 (WCDs 112 of the RLs 110) may be highly configurable. In at least some embodiments, for example, the BS configuration information for configuration of the BSs 120 includes reference quality metric thresholds to be used for each of the carrier frequencies as well as BS assignment information indicative of specific assignments of RLs 110 to specific BSs 120 (or specific beams of specific BSs 120). In at least some such embodiments, configuration of the BSs 120 may include setting the reference quality metric thresholds for the carrier frequencies on the BSs 120 as well as setting various beam parameters for the BSs 120 in order to configure the BSs 120 based on the BS assignment information. For example, the BS configuration information for a BS 120 may include, for each of the beams to be illuminated by the BS 120, information such as the carrier frequency of the beam B(i,k,Mi(b),b), the time T(i,k,Mi(b),b) spent illuminating the beam on the carrier frequency, the power for the beam on the carrier frequency, the spatial orientation of the direction of the beam (e.g., in azimuth Az(i,j,Mi(b),b) and tilt Tilt(i,j,Mi(b),b)), or the like, as well as various combinations thereof. For example, the BS assignment information for a BS 120 may include, for each of the RLs 110 to be served by a given BS 120, information such as a beam on which the RL 110 is to be served, a carrier frequency of the beam on which the RL 110 is to be served, one or more characteristics of the beam on which the RL 110 is to be served, or the like, as well as various combinations thereof. The BS configuration information may include various other types of information which may be used to configure BSs 120 to support attachment of the RLs 110 (WCDs 112 of the RLs 110) to the carrier frequencies based on the jointly determined assignment of the RLs 110 (WCDs 112 of the RLs 110) to the carrier frequencies supported by the BSs 120. It is noted that, in at least some such embodiments, even though the BS configuration information for configuration of the BSs 120 includes specific assignments of RLs 110 to specific BSs 120 (or specific beams of specific BSs 120), configuration of the BSs 120 still may rely on beam control capabilities of the BSs 120 (e.g., pre-configured beam illumination settings, pre-configured beam sweeping settings, pre-configured beam parameters, or the like, as well as various combinations thereof).

It will be appreciated that various combinations of configurability and, similarly, BS configuration information, may be used to configure the BSs 120 based on the jointly determined assignment of the RLs 110 (WCDs 112 of the RLs 110).

The WCC 130 may be configured to control configuration of the BSs 120 to attach the RLs 110 (WCDs 112 of the RLs 110) to carrier frequencies, in order to provide wireless broadband connectivity for the WCDs 112 of RLs 110, over various time scales, based on various schedules, responsive to various conditions, or the like, as well as various combinations thereof. For example, configuration of the BSs 120 to attach the RLs 110 (WCDs 112 of the RLs 110) to carrier frequencies may be performed periodically, based on a pre-determined schedule, dynamically to account for various types of system dynamics (e.g., user activity, user mobility, or the like), or the like, as well as various combinations thereof.

The WCC 130 may be configured to control configuration of the WCDs 112 to attach to carrier frequencies in order to provide wireless broadband connectivity for the WCDs 112. The WCC 130 may be configured to control configuration of the WCDs 112 to attach to carrier frequencies by determining configuration information describing attachment of the WCDs 112 to the carrier frequencies (e.g., which carrier frequencies the WCDs 112 are to use, the time intervals in which the WCDs 112 are to use those carrier frequencies, or the like) and sending the configuration information to the BSs 120 (e.g., for delivery of the configuration to the WCDs 112 by the BSs 120, for further processing of the configuration information by the BSs 120 to provide modified configuration information and delivery of the modified configuration to the WCDs 112 by the BSs 120, or the like, as well as various combinations thereof. It will be appreciated that, since the delivery of the configuration information to the WCDs 112 is via the BSs 120, the BSs 120 also are configured to support configuration of the WCDs 112 to attach to carrier frequencies in order to provide wireless broadband connectivity for the WCDs 112.

The WCC 130 may be configured to perform various other functions in order to provide wireless broadband connectivity for the WCDs 112 of the RLs 110.

It will be appreciated that, although primarily depicted and described with respect to embodiments in which control over configuration of the BSs 120 to attach the RLs 110 (WCDs 112 of the RLs 110) to carrier frequencies in order to provide wireless broadband connectivity for the WCDs 112 of RLs 110 is centralized, control over attachment of WCDs 112 of RLs 110 to BSs 120 to provide wireless broadband connectivity for the WCDs 112 of RLs 110 may be distributed in various ways. For example, control over configuration of the BSs 120 to attach the RLs 110 (WCDs 112 of the RLs 110) to carrier frequencies to provide wireless broadband connectivity for the WCDs 112 of RLs 110 may be distributed across a set of WCCs (e.g., in a cloud-based implementation where various functions may be distributed across various computing elements such as virtual machines (VMs)), rather than using a single, centralized WCC 130 as depicted and described with respect to FIG. 1. For example, control over configuration of the BSs 120 to attach the RLs 110 (WCDs 112 of the RLs 110) to carrier frequencies to provide wireless broadband connectivity for the WCDs 112 of RLs 110 may be distributed across a subset of the BSs 120 (e.g., one BS 120 operating as a controller for a set of BSs 120 in a particular geographic region, multiple BSs 120 cooperating to operate as a controller for a set of BSs 120 in a particular geographic region, or the like), may be distributed across all BSs 120, or the like. It will be appreciated that distribution of control functions in such ways may require various exchanges of information between the various control elements which cooperate to control configuration of the BSs 120 to attach the RLs 110 (WCDs 112 of the RLs 110) to carrier frequencies.

It will be appreciated that, for purposes of clarity, FIG. 1 depicts a relatively small set of RLs 110 distributed over a relatively small geographic region (e.g., a neighborhood or portion of a neighborhood) that is being served by a relatively small number of BSs 120 under the control of the WCC 130; however, it also will be appreciated that WCC 130 may be configured to serve fewer or more RLs 110 over a smaller or larger geographic region using fewer or more BSs 120. Accordingly, various aspects of embodiments supporting wireless broadband connectivity may be provided at various scales (e.g., locally, regionally, or the like) using various numbers and arrangements of wireless network access devices (e.g., BSs 120).

Figure 2A:
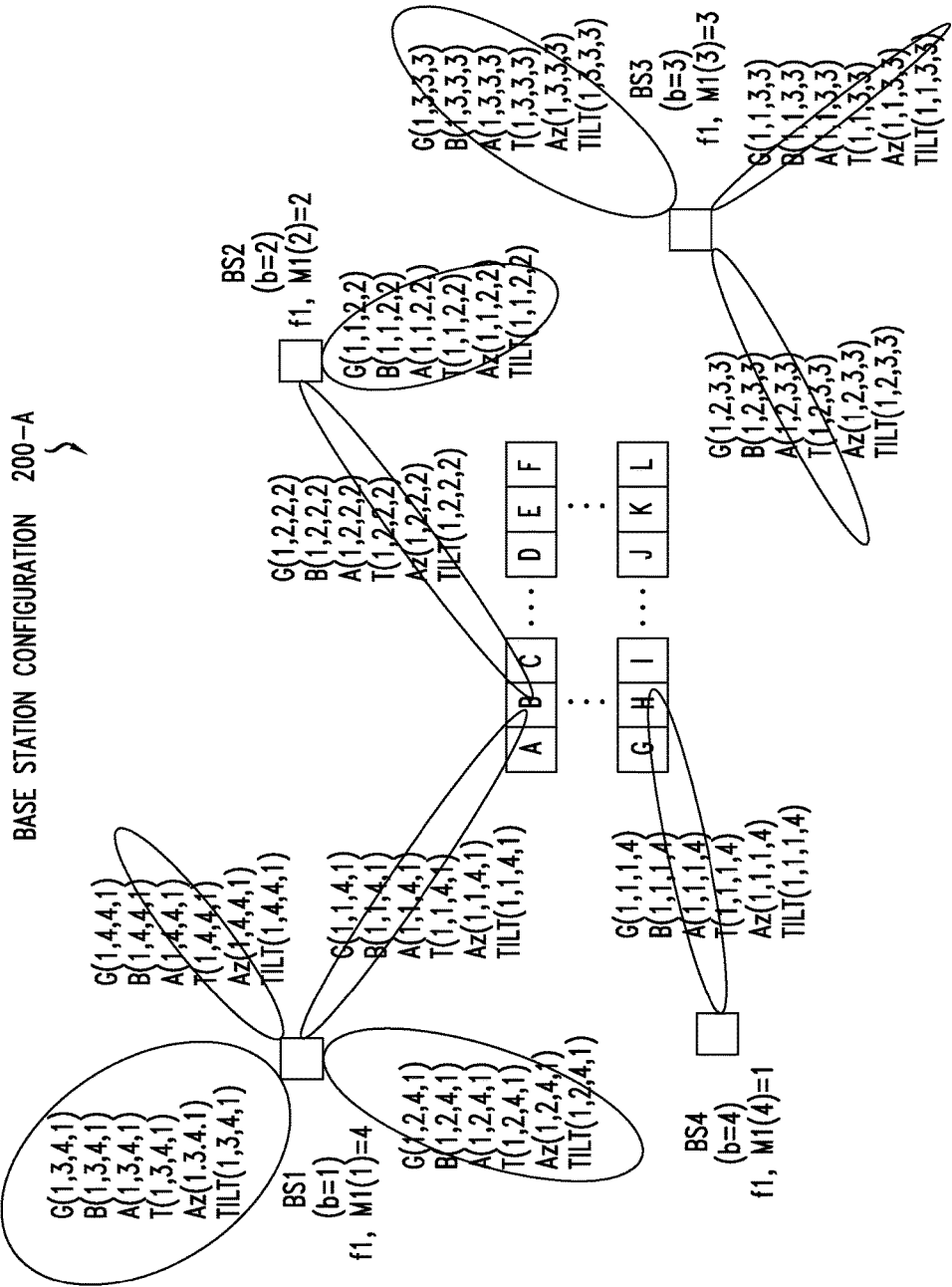
FIGS. 2A-2C depict snapshots of base station configurations for the hybrid wireless communication system of FIG. 1 at different time instances.
Figure 2B:
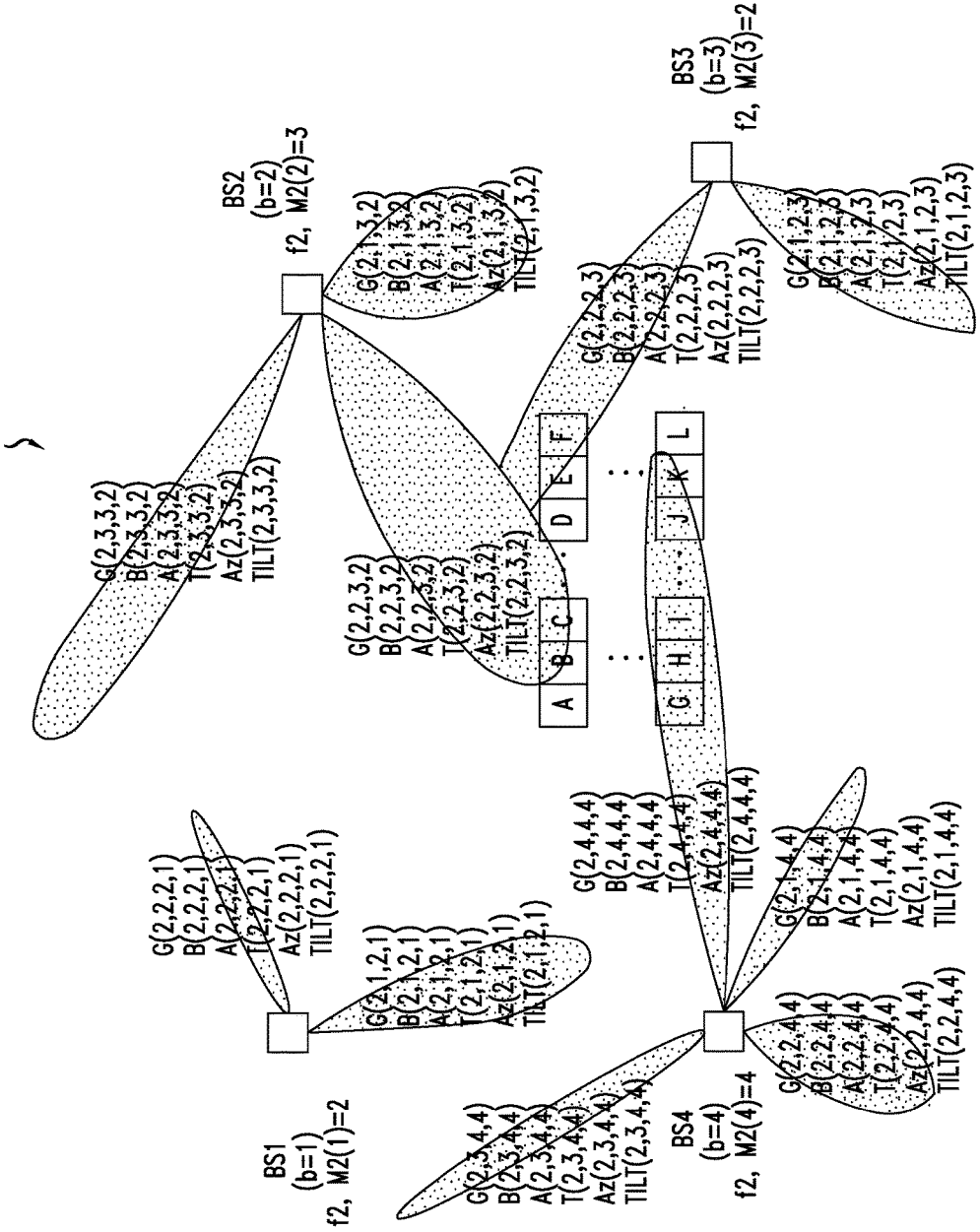
Figure 2C:
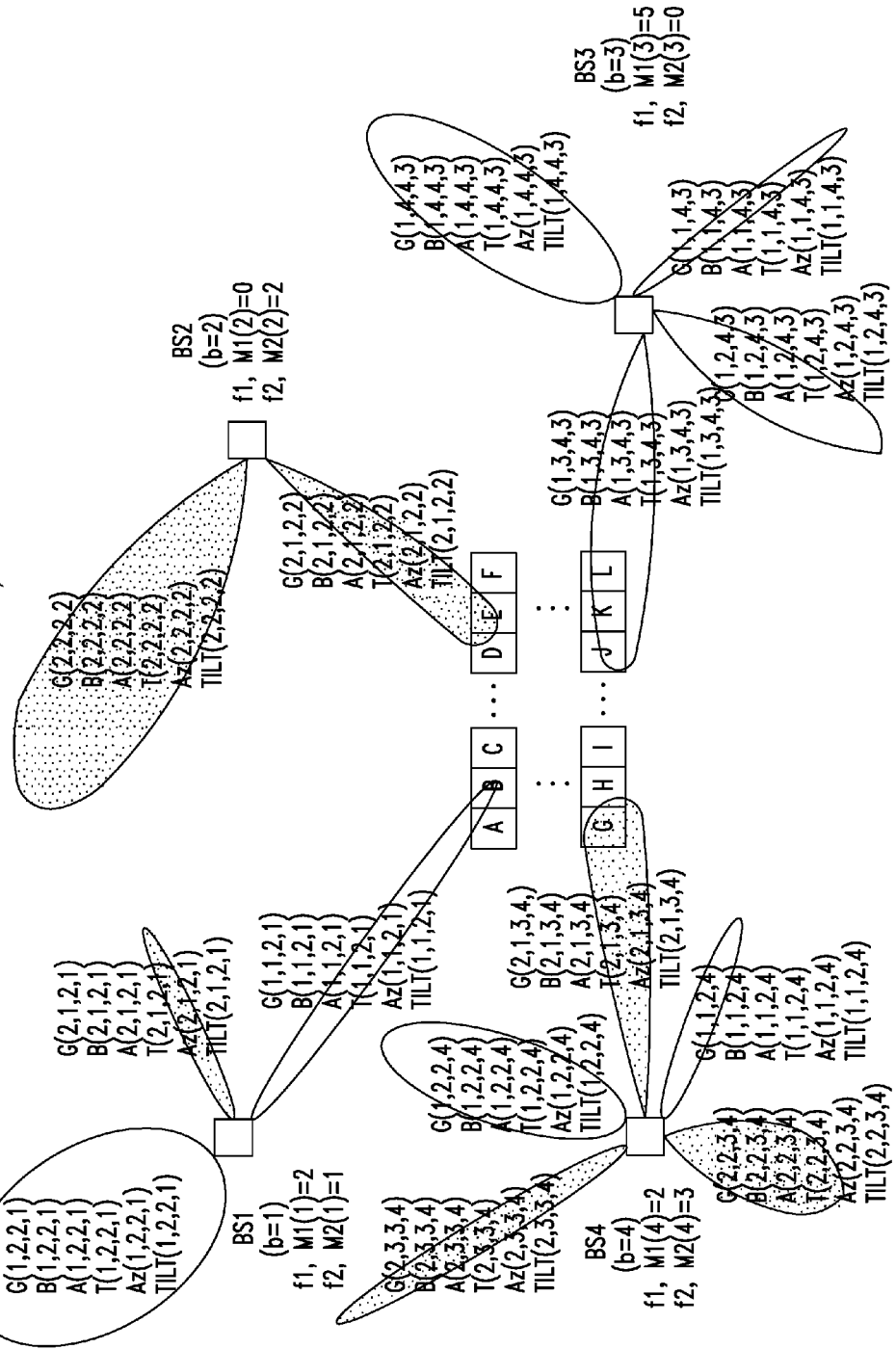

It is noted that configuration of BSs 120, by WCC 130, to support wireless communications for RLs 110 in order to provide wireless broadband connectivity for the RLs 110 may be further understood by way of reference to exemplary configurations of BS 120 over a set of time instances, as depicted in FIGS. 2A-2C.

FIGS. 2A-2C depict snapshots of base station configurations for the hybrid wireless communication system of FIG. 1 at different time instances. As in hybrid wireless communication system 100 of FIG. 1, the hybrid wireless communication system depicted in FIGS. 2A-2C includes four BSs (BS1, BS2, BS3, and BS4, such that the indices of the BSs are from 1-4) serving twelve RLs (A, B, C, D, E, F, G, H, I, J, K, L) where the four BSs are configured to operate on two carrier frequencies (f1 and f2, such that F=2) and, further, where each of the four BSs has a maximum number of steerable beams for each carrier frequency out of which a subset may be temporarily illuminated. As discussed herein, the beams illuminated by the BSs may have different characteristics (shape and gain), and their number may vary with the BS, frequency, and time.

FIGS. 2A-2C depict snapshots of base station configurations for BS1, BS2, BS3, and BS4 at three different time instances (denoted as time instances T1, T2, and T3). The three time instances may correspond to execution of processes for configuring the BSs to support RLs based on a schedule (e.g., the time instances represent scheduling intervals of a schedule (e.g., periodically, using non-periodic scheduling, or the like)), execution of processes for configuring the BSs to support RLs responsive to detection of conditions (e.g., increases or decreases in demand from RLs, BS errors or failures or other network errors or failures, or the like), or the like, as well as various combinations thereof. The snapshots illustrate the manner in which BSs may be reconfigured over time (e.g., activating and deactivating beams, using various combinations of carrier frequencies on beams, modifying the spatial configuration of beams, or the like, as well as various combinations thereof) to provide wireless broadband connectivity to the RLs in various ways.

FIG. 2A depicts a base station configuration 200-A at time instance T1. As depicted in FIG. 2A, at time instance T1, beams are illuminated only on carrier frequency f1. For example, BS1 (referenced by the index b=1) has four active beams on frequency f1, $M1(1)=4$, identified by $B(1,1,4,1)$, $B(1,2,4,1)$, $B(1,3,4,1)$, and $B(1,4,4,1)$, respectively, where the first index is the carrier frequency identifier (i=1 for f1), the second index is for the active beam (j ranging from 1 to 4), the third index is the number of active beams on carrier f1 ($M1(1)=4$), and the fourth index is the BS identifier (b=1). The four beams of BS1 are characterized by specific antenna gains $G(i,j,Mi(b),b)$, angular widths $A(i,j,Mi(b),b)$, and times of beam illumination $T(i,j,Mi(b),b)$, respectively. For instance, $G(1,1,4,1)$ is the antenna gain from the BS1 (b=1) on the carrier frequency f1 (i=1) for the beam indexed as 1 (j=1) at time T1. In the same way, the specific spatial orientation may be defined in azimuth $Az(i,j,Mi(b),b)$ and tilt $Tilt(i,j,Mi(b),b)$. Similarly, for example, BS2 (referenced by the index b=2) has two active beams on carrier frequency f1, identified by B(1,1,2,2) and B(1,2,2,2). Similarly, for example, BS3 (referenced by the index b=3) has three active beams on carrier frequency f1, identified by B(1,1,3,3), B(1,2,3,3), and B(1,3,3,3). Similarly, for example, BS4 (referenced by the index b=4) has only one active beam on carrier frequency f1, identified by B(1,1,1,4). As depicted in FIG. 2A, BS1 and BS2 are serving location B and its surroundings on carrier frequency f1 (illustratively, beam B(1,1,4,1) of BS1 and beam B(1,2,2,2) of BS2) and, similarly, BS4 is serving locations G. H and I and their surroundings on carrier frequency f1 (illustratively, beam B(1,1,1,4) of BS4).

FIG. 2B depicts a base station configuration 200-B at time instance T2. As depicted in FIG. 2B, at time instance T2, beams are illuminated only on carrier frequency f2. For example, BS1 (referenced by the index b=1) has two active beams on frequency f2, M2(2)=2, identified by B(2,1,2,1) and B(2,2,2,1), respectively, where the first index is the carrier frequency identifier (i=2 for f2), the second index is for the active beam (j ranging from 1 to 2), the third index is the number of active beams on carrier f2 (M2(2)=2), and the fourth index is the BS identifier (b=1). The two beams of BS1 are characterized by specific antenna gains G(i,j,Mi(b),b), angular widths A(i,j,Mi(b),b), and times of beam illumination T(i,j,Mi(b),b), respectively. For instance, G(2,1,2,1) is the antenna gain from the BS1 (b=1) on the carrier frequency f2 (i=2) for the beam indexed as 1 (j=1) at time T2. In the same way, the specific spatial orientation may be defined in azimuth Az(i,j,Mi(b),b) and tilt Tilt(i,j,Mi(b),b). Similarly, for example, BS2 (referenced by the index b=2) has three active beams on carrier frequency f2, identified by B(2,1,3,2), B(2,2,3,2), and B(2,3,3,2). Similarly, for example, BS3 (referenced by the index b=3) has two active beams on carrier frequency f2, identified by B(2,1,2,3) and B(2,2,2,3). Similarly, for example, BS4 (referenced by the index b=4) has four active beams on carrier frequency f2, identified by B(2,1,4,4), B(2,2,4,4), B(2,3,4,4), and B(2,4,4,4). As depicted in FIG. 2B, BS2 is serving locations B and C and their surroundings on carrier frequency f2 (illustratively, beam B(2,2,3,2) of BS2), BS4 is serving locations G, H, I, J, K, L and their surroundings on carrier frequency f2 (illustratively, beam B(2,4,4,4) of BS4), and BS3 is serving locations E and F and their surroundings on carrier frequency f2 (illustratively, beam B(2,2,2,3) of BS3).

FIG. 2C depicts a base station configuration 200-C at time instance T3. As depicted in FIG. 2C, at time instance T3, beams are illuminated on both carrier frequency f1 and on carrier frequency f2. For example, BS1 (referenced by the index b=1) has (a) two active beams on frequency f1, M1(1)=2, identified by B(1,1,2,1) and B(1,2,2,1), respectively, where the first index is the carrier frequency identifier (i=1 for f1), the second index is for the active beam (j ranging from 1 to 2), the third index is the number of active beams on carrier f1 (M1(1)=2), and the fourth index is the BS identifier (b=1) and (b) one active beam on frequency f2, M2(1)=1, identified by B(2,1,2,1), where the first index is the carrier frequency identifier (i=2 for f2), the second index is for the active beam (j=1), the third index is the number of active beams on carrier f2 (M2(1)=1), and the fourth index is the BS identifier (b=1). The three beams of BS1 are characterized by specific antenna gains G(i,j,Mi(b),b), angular widths A(i,j,Mi(b),b), and times of beam illumination T(i,j,Mi(b),b), respectively. For instance, G(1,1,2,1) is the antenna gain from the BS1 (b=1) on the carrier frequency f1 (i=1) for the beam indexed as 1 (j=1) at time T3. In the same way, the specific spatial orientation may be defined in azimuth Az(i,j,Mi(b),b) and tilt Tilt(i,j,Mi(b),b). Similarly, for example, BS2 (referenced by the index b=2) has (a) no active beams on carrier frequency f1 and (b) two active beams on carrier frequency f2, identified by B(2,1,2,2) and B(2,2,2,2). Similarly, for example, BS3 (referenced by the index b=3) has (a) four active beams on carrier frequency f1, identified by B(1,1,4,3), B(1,2,4,3), B(1,3,4,3) and B(1,4,4,3) and (b) no active beams on carrier frequency f2. Similarly, for example, BS4 (referenced by the index b=4) has (a) two active beams on carrier frequency f1, identified by B(1,1,2,4) and B(1,2,2,4) and (b) three active beams on carrier frequency f2, identified by B(2,1,3,4), B(2,2,3,4) and B(2,3,3,4). As depicted in FIG. 2C, BS1 is serving location B and its surroundings on carrier frequency f1 (illustratively, beam B(1,1,2,1)), BS2 is serving locations D and E and their surroundings on carrier frequency f2 (illustratively, beam B(2,1,2,2)), BS3 is serving locations J, K, and L and their surroundings on carrier frequency f1 (illustratively, beam B(1,3,4,3), and BS4 is serving location G and its surroundings on carrier frequency f2 (illustratively, beam B(2,1,3,4).

It will be appreciated that FIGS. 2A-2C merely depict exemplary snapshots of base station configurations and that various other base station configurations may be supported.

FIG. 3 depicts an embodiment of a method for configuring base stations to support broadband connectivity for a set of receiver locations. It will be appreciated that, although primarily presented as being performed serially, at least a portion of the functions of method 300 may be performed contemporaneously or in a different order than as presented in FIG. 3.

At block 301, method 300 begins.

At block 310, assignment of receiver locations to carrier frequencies is jointly determined to provide thereby a joint assignment of receiver locations to carrier frequencies.

The assignment of receiver locations to carrier frequencies may be determined jointly for the carrier frequencies. The carrier frequencies may include a set of two or more carrier frequencies.

The joint assignment of receiver locations to carrier frequencies may be jointly determined based on respective sets of reference quality metric thresholds of a reference quality metric (e.g., RSSI, SINR, or the like) for the respective carrier frequencies. The sets of reference quality metric thresholds of the respective carrier frequencies may be different for different carrier frequencies. The set of reference quality metric thresholds for a given carrier frequency may include one or more thresholds. The sets of reference quality metric thresholds for the carrier frequencies may include different numbers of reference quality metric thresholds (e.g., the set of reference quality metric thresholds for a first carrier frequency may include four thresholds and the set of reference quality metric thresholds for a second carrier frequency may include three thresholds). The sets of reference quality metric thresholds for the carrier frequencies may include the same threshold values, different threshold values, or combinations thereof. For example, where the set of carrier frequencies includes two carrier frequencies including a first carrier frequency f1 (having three RSSI thresholds associated therewith, including Th(1,1), Th(1,2), and Th(1,3)) and a second carrier frequency f2 (having two RSSI thresholds associated therewith, including Th(2,1) and Th(2,2)), the values of the RSSI thresholds may be as follows: Th(1,1)=−80 dB, Th(1,2)=−70 dB, Th(1,3)=−60 dB, Th(2,1)=−50 dB, and Th(2,2)=−40 dB. It will be appreciated that these RSSI values are merely exemplary and that any other suitable values or combinations of values may be used.

The joint assignment of receiver locations to carrier frequencies may be jointly determined based on a reference performance metric. The reference performance metric may have a reference performance metric type associated therewith, a reference performance metric evaluation type associated therewith, a reference performance metric evaluation level associated therewith, or the like, as well as various combinations thereof. The reference performance metric may be a Key Performance Indicator (KPI) or other suitable performance metric. The reference performance metric type of the reference performance metric may indicate that type of the reference performance metric. For example, the reference performance metric may be a data rate type performance metric (e.g., for bandwidth intensive applications), a throughput type performance metric (e.g., for bandwidth intensive applications), a latency type performance metric (e.g., for delay intensive applications), or the like. The reference performance metric evaluation type associated therewith with the reference performance metric may indicate the granularity at which the reference performance metric is evaluated (e.g., per location, per active wireless communication device, per base station, overall system level, or the like). The reference performance metric evaluation type associated therewith with the reference performance metric may indicate the CDF level at which the reference performance metric is evaluated (e.g., 5% for cell edge, 50% as a median reference point, 95%, or the like).

It is noted that the joint assignment of receiver locations to the carrier frequencies may be considered to be jointly determined since, for each location Rxy, each of the carrier frequencies is evaluated and the best carrier frequency for the receiver location to attach to is determined based on a reference performance metric (e.g., satisfy a number of active WCDs at the receiver locations given a certain KPI such as throughput or delay). Here, the satisfaction criteria may be fulfilled by coordinating across the multiple carrier frequencies. For example, assuming that two carrier frequencies f1 (e.g., centered at 28 GHz with 250 MHz of bandwidth) and f2 (e.g., centered at 3.5 GHz with 40 MHz of bandwidth) are available for use in the geographic region and N WCDs are located within the geographic region, the jointly determined assignment will result in a subset of N1 WCDs connected to carrier frequency f1 and a subset of N2 WCDs connected to f2 where N1+N2=N). If the reference performance metric is data rate with a reference performance metric evaluation type of per active WCD and a reference performance metric evaluation level of 5% (e.g., at cell edge), it may be determined that the optimal joint assignment of the receiver locations to the carrier frequencies results in a configuration in which only 5% of the total WCDs will end up with less than some amount of data rate per active WCD (e.g., 100 Mbps, 150 Mbps, or the like).

The joint assignment of the receiver locations to the carrier frequencies may be jointly determined by (1) determining, for each carrier frequency based on the respective set of reference quality metric thresholds for the respective carrier frequency, a respective set of candidate assignments of the receiver locations to the respective carrier frequency and (2) selecting, for each carrier frequency, one of the candidate assignments of the receiver locations to the respective carrier frequency based on evaluation of the candidate assignments of the receiver locations to the respective carrier frequency based on the reference performance metric. It will be appreciated that, for each of the receiver locations, the jointly determined assignment of the receiver location to the carrier frequencies may result in a joint assignment of the receiver location to the carrier frequencies (e.g., the receiver location may be assigned to both f1 and f2) or a disjoint assignment of the receiver location to the carrier frequencies (e.g., the receiver location may be assigned to only one of f1 or f2). An exemplary embodiment of a method for jointly determining assignment of receiver locations to carrier frequencies is presented with respect to FIG. 4.

At block 320, base stations are configured based on the jointly determined assignment of the receiver locations to the carrier frequencies. The base stations may be configured by sending base station configuration information to the base stations. The base station configuration information is determined based on jointly determined assignment of the receiver locations to the carrier frequencies. The base station configuration information is configured for use by the base stations in configuring the base stations to support the jointly determined assignment of the receiver locations to the carrier frequencies. The base station configuration information may depend on the level of configurability of the base stations, as discussed above. For example, for base station configuration 200-C of FIG. 2C, the base station configuration information sent to BS1 for that time period may include one or more messages indicative that BS1 is to use carrier frequency f1 and carrier frequency f2 during that time period (e.g., including the respective reference quality metric thresholds for the carrier frequencies and optionally including more specific configuration information describing the manner in which the carrier frequencies are to be used by BS1 within the geographic region). For example, for base station configuration 200-C of FIG. 2C, the base station configuration information sent to BS2 for that time period may include one or more messages indicative that BS2 is to only use carrier frequency f2 during that time period (e.g., including the reference quality metric threshold for the carrier frequency f2 and optionally including more specific configuration information describing the manner in which the carrier frequency f2 is to be used by BS2 within the geographic region). For example, for base station configuration 200-C of FIG. 2C, the base station configuration information sent to BS3 for that time period may include one or more messages indicative that BS3 is to only use carrier frequency f1 during that time period (e.g., including the reference quality metric threshold for the carrier frequency f1 and optionally including more specific configuration information describing the manner in which the carrier frequency f1 is to be used by BS3 within the geographic region). For example, for base station configuration 200-C of FIG. 2C, the base station configuration information sent to BS4 for that time period may include one or more messages indicative that BS4 is to use carrier frequency f1 and carrier frequency f2 during that time period (e.g., including the respective reference quality metric thresholds for the carrier frequencies and optionally including more specific configuration information describing the manner in which the carrier frequencies are to be used by BS4 within the geographic region). It will be appreciated that the more specific configuration information which may be provided to the base stations may include parameters such beam parameters (e.g., one or more of power $P(i,j)$ for the j-th beam on carrier frequency fi, directivity gain $G(i,j)$, angular width $A(i,j)$, azimuth $Az(i,j)$, tilt $Tilt(i,j)$ for the j-th beam on carrier frequency fi, or the like) or the like. It will be appreciated that the base station configuration information may include various other types of configuration information.

At block 399, method 300 ends.

It will be appreciated that, although omitted from FIG. 3 for purposes of clarity, the WCDs at the receiver locations also may be configured based on the jointly determined assignment of the receiver locations to the carrier frequencies. The WCDs may be configured by sending WCD configuration information to the WCDs. The WCD configuration information is determined based on jointly determined assignment of the receiver locations to the carrier frequencies. The WCD configuration information is configured for use by the WCDs in configuring the WCDs to support the jointly determined assignment of the receiver locations to the carrier frequencies. The WCD configuration information may depend on the level of configurability of the WCDs, as discussed above. For example, for base station configuration 200-A of FIG. 2A, the WCD configuration information sent to the WCD at receiver location B for that time period may include (1) a message provided to the WCD at receiver location B, either via the BS1 or the BS2, where the message is indicative that the WCD at receiver location B is to use carrier frequency f1 (and, optionally, that the WCD is to communicate via BS1 and BS2) during that time period or (2) a first message provided to the WCD at receiver location B via the BS1 where the message is indicative that the WCD at receiver location B is to use carrier frequency f1 (and, optionally, that the WCD is to communicate via BS1) during that time period and a second message provided to the WCD at receiver location B via the BS2 where the message is indicative that the WCD at receiver location B is to use carrier frequency f1 (and, optionally, that the WCD is to communicate via BS2) during that time period. For example, for base station configuration 200-B of FIG. 2B, the WCD configuration information sent to the WCD at receiver location F for that time period may include a message provided to the WCD at receiver location F, via the BS3, where the message is indicative that the WCD at receiver location F is to use carrier frequency f2 (and, optionally, that the WCD is to communicate via BS3) during that time period. For example, for base station configuration 200-C of FIG. 2C, the WCD configuration information sent to the WCD at receiver location G for that time period may include a message provided to the WCD at receiver location G, via the BS4, where the message is indicative that the WCD at receiver location G is to use carrier frequency f2 (and, optionally, that the WCD is to communicate via BS4) during that time period. It will be appreciated that WCD configuration information may include various other types of configuration information.

FIG. 4 depicts an embodiment of a method for jointly determining assignment of receiver locations to carrier frequencies. It is noted that method 400 may be used to provide block 310 of method 300 of FIG. 3. It will be appreciated that, although primarily presented as being performed serially, at least a portion of the functions of method 400 may be performed contemporaneously or in a different order than as presented in FIG. 4.

At block 401, method 400 begins.

At block 410, for each carrier frequency, a set of candidate assignments of receiver locations to the respective carrier frequency is determined based on a set of reference quality metric thresholds associated with the carrier frequency. An exemplary embodiment of a method for determining candidate assignments of receiver locations to carrier frequencies is presented with respect to FIGS. 5A and 5B.

At block 420, for each carrier frequency, one of the candidate assignments of the receiver locations to the respective carrier frequency is selected based on evaluation of the respective set of candidate assignments of the receiver locations to the respective carrier frequency based on a reference performance metric. The reference performance metric may be a system-level metric, a per-BS metric, a per-WCD metric, or the like. The reference performance metric may be a data rate metric (e.g., data rate per BS, data rate per active WCD, or the like), a throughput metric (e.g., throughput per BS, throughput per active WCD, or the like), a latency metric (e.g., latency in the wireless access system, end-to-end network latency, latency per active WCD, or the like), or the like. An exemplary embodiment of a method for evaluating candidate assignments of receiver locations to carrier frequencies is presented with respect to FIGS. 6A and 6B.

At block 499, method 400 ends.

Figure 5A:
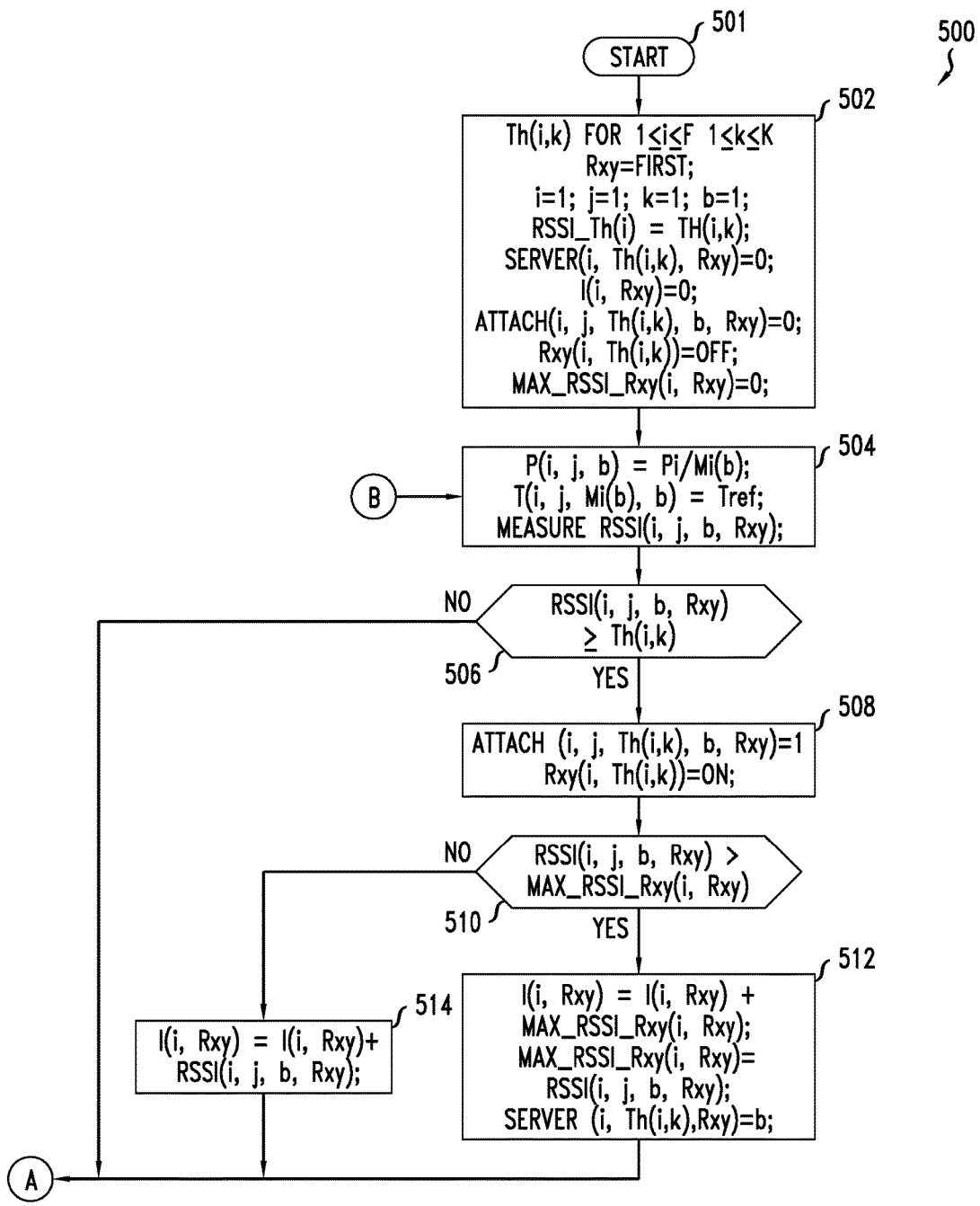
FIGS. 5A and 5B depict an embodiment of a method for determining candidate assignments of receiver locations to carrier frequencies based on respective sets of reference quality metric thresholds associated with the carrier frequencies.
Figure 5B:
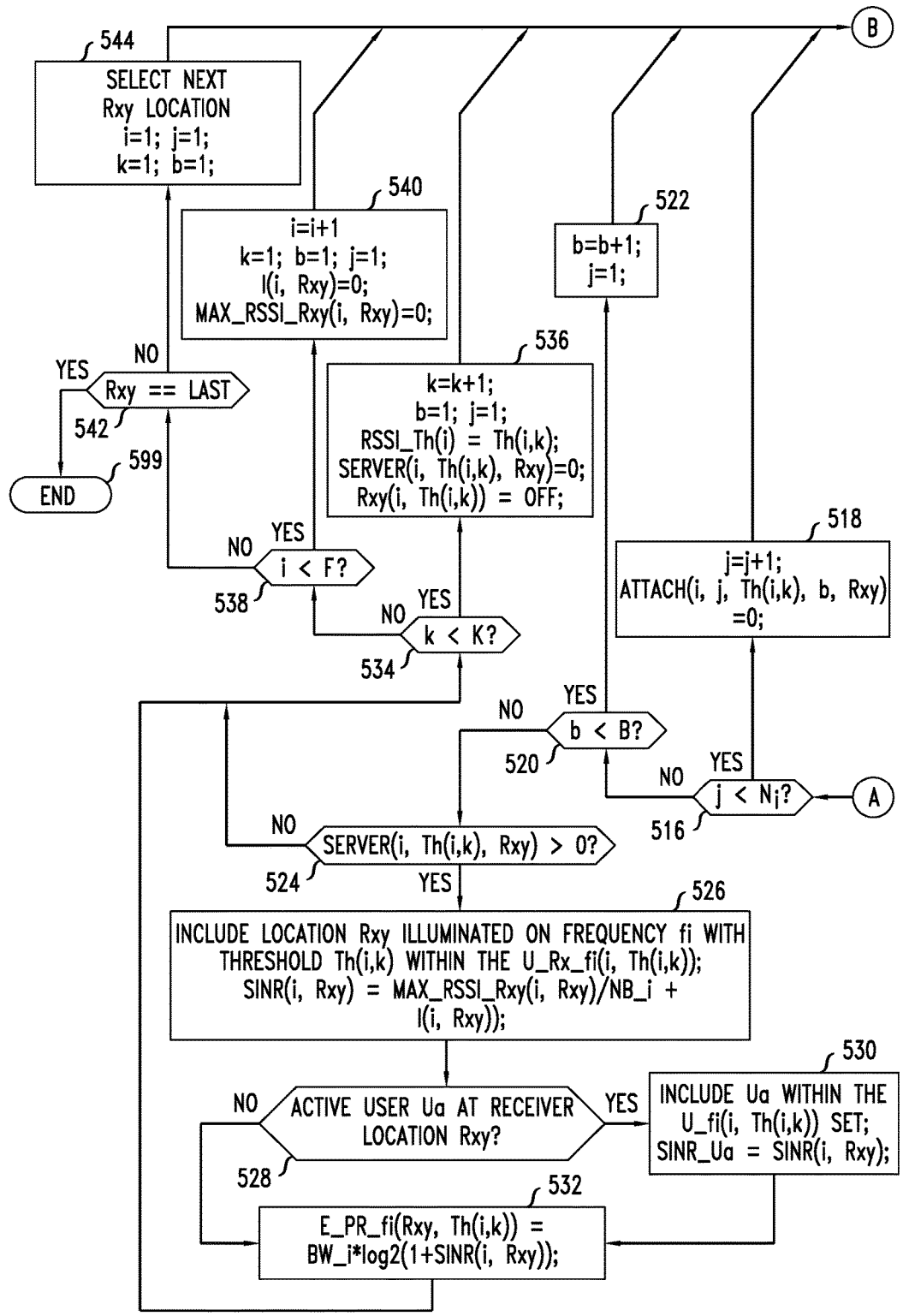

FIGS. 5A and 5B depict an embodiment of a method for determining candidate assignments of receiver locations to carrier frequencies based on respective sets of reference quality metric thresholds associated with the carrier frequencies. It is noted that, for purposes of clarity, method 500 is configured to use the RSSI as the reference quality metric (although it will be appreciated that method 500 may be modified to use other reference quality metrics, such as SINR or others). It is noted that, for purposes of clarity, method 500 is configured to consider a single active steerable beam at any instance at each BS (although it will be appreciated that method 500 may be modified to account for multiple sequences of steerable beams that are simultaneously active at a BS at any given time). It is noted that method 500 may be used to provide block 410 of method 400 of FIG. 4. It will be appreciated that, although primarily presented as being performed serially, at least a portion of the functions of method 400 may be performed contemporaneously or in a different order than as presented in FIGS. 5A and 5B.

At block 501, method 500 begins.

At block 502, a number of variables and values are initialized and the first receiver location Rxy of the geographic region to be evaluated is selected (Rxy=First).

The sets of K quality threshold values $\{Th(i,1), Th(i,2), \ldots, Th(i,K)\}$ for the carrier frequencies fi ($1 \leq i \leq F$) are set, respectively.

The following variables also are initialized: (a) i=1 (i is the index of the carrier frequency, corresponding to fi), (b) j=1 (j is the index of the active steerable beam on frequency fi), (c) k=1 (k is the index corresponding to the Th(i,k) threshold on frequency fi), and (d) b=1 (b is the index of the base station aiming at providing coverage to the receiver location Rxy). It is noted that the number of quality thresholds may differ from carrier frequency to carrier frequency, but, for simplicity and without losing generality, it is assumed that the same number of thresholds are used for each carrier frequency.

The following variables also are initialized: (a) RSSI_Th(i)=Th(i,k), the RSSI threshold RSSI_Th(i) currently used on carrier frequency fi is set to threshold value Th(i,k), (b) Server(i, Th(i,k), Rxy)=0, which indicates the BS (server) identified as providing service to the receiver location Rxy on carrier frequency fi with respect to the threshold value Th(i,k), (c) I(i, Rxy)=0, which initializes the interference received at the location Rxy on carrier frequency fi, (d) Attach(i, j, Th(i,k), b, Rxy)=0, which indicates attachment status of the receiver location Rxy to carrier frequency fi on the j-th beam of the b-th BS with Mi(b) active beams with respect to the threshold value Th(i,k) (when this parameter is set to 0, it means non-attached to carrier frequency fi and when set to 1 it means attached to carrier frequency fi, (e) Rxy(i, Th(i,k))=OFF, which indicates the serviceability status of the receiver location Rxy on carrier frequency fi with respect to the threshold value Th(i,k) (where OFF means non-operating on carrier frequency fi and ON means operating on carrier frequency fi), and (f) Max_RSSI_Rxy(i, Rxy)=0, which initializes the maximum received RSSI value at the receiver location Rxy on carrier frequency fi.

At block 504, a number of variables and values related to the beams are initialized. The following variables are initialized: (a) P(i, j, b)=Pi/Mi(b), which initializes the power illuminating the j-th beam on BS b with Mi(b) active beams on carrier frequency fi, (b) T(i, j, Mi(b),b)=Tref, which initializes the time spent illuminating the j-th beam on BS b with Mi(b) active beams on carrier frequency fi, and (c) RSSI(i, j, b, Rxy), which initializes the measured RSSI value at the receiver location Rxy while operating on the j-th beam of the b-th BS on carrier frequency fi. It is noted that the RSSI levels are measured over a time interval (e.g., scheduling interval or other interval) and, if a beam is not illuminated, then the corresponding measured RSSI value is null. This causes wireless signals to be illuminated on the beams of the BSs such that RSSI measurements may be collected from the receiver locations Rxy for the various carrier frequencies. This may be performed by sending control messages to the BSs to cause the BSs to set the power on each beam j on each carrier frequency fi. As a result, the b-th BS illuminates, via a wireless signal, its j-th beam on carrier frequency fi to provide service to the receiver location Rxy where the wireless signal that is illuminated may be a control signal suitable for enabling the WCDs at the locations being illuminated to measure and report RSSI (e.g., control signals such as a reference signal, a pilot signal, a preamble, or the like). The WCDs at the receiver locations Rxy detect the wireless signals illuminated by the BSs, measure the corresponding RSSI values for the wireless signals illuminated by the BSs, and send RSSI measurement reports to the BSs for the wireless signals illuminated by the BSs (RSSI(i,j,b,Rxy)). In general, an RSSI measurement report provided by a WCD at a receiver location Rxy, RSSI(i,j,b,Rxy), indicates the RSSI measured by the WCD at the receiver location Rxy responsive to illumination by the b-th BS of the j-th beam on carrier frequency fi. The BSs may then deliver the RSSI measurement reports of the WCDs of the receiver locations Rxy for use in determining candidate assignments of receiver locations Rxy to carrier frequencies based on the respective sets of reference quality metric thresholds associated with the carrier frequencies. In this manner, RSSI measurements may be collected from the receiver locations Rxy for the various carrier frequencies.

At block 506, a determination is made as to whether the measured RSSI at receiver location Rxy from the j-th beam of the b-th BS on carrier frequency fi, RSSI(i, j, b, Rxy), is greater than or equal to the current quality threshold Th(i,k). If RSSI(i, j, b, Rxy)≥Th(i,k), method 500 proceeds to block 508. If RSSI(i, j, b, Rxy)<Th(i,k), method 500 proceeds to block 516 (to check for the next potential active beam over the timer interval). It is noted that, if the beam is not illuminated, the corresponding measured RSSI value is null and, thus, method 500 proceeds to block 516.

At block 508, the receiver at location Rxy is attached to the j-th beam of the b-th BS on carrier frequency fi with respect to the quality threshold Th(i,k), which is indicated using Attach(i, j, Th(i,k), b, Rxy)=1 and Rxy(i, Th(i,k))=ON. It is noted that the recording of the detailed attachment here is optional, and may be used to maintain full track of the connectivity to a carrier frequency, a BS, and a specific beam, subject to a quality threshold.

At block 510, a determination is made as to whether measured RSSI at receiver location Rxy from the j-th beam of the b-th BS on carrier frequency fi, RSSI(i, j, b, Rxy), is greater than the current maximum received RSSI value at the receiver location Rxy on carrier frequency fi, Max_RSSI_Rxy(i, Rxy), which was determined based on previous measurements. If RSSI(i, j, b, Rxy)>Max_RSSI_Rxy(i, Rxy), method 500 proceeds to block 512. If RSSI(i, j, b, Rxy)<=Max_RSSI_Rxy(i, Rxy), method 500 proceeds to block 514.

At block 512, a number of variable updates are performed and a BS is assigned to be the serving BS for the receiver location Rxy. The variable updates include the following: (a) the interference received at the location Rxy on carrier frequency fi is updated by adding the currently stored Max_RSSI_Rxy(i, Rxy) value to the stored interference level, (b) the maximum received RSSI value at the receiver location Rxy on carrier frequency fi, Max_RSSI_Rxy(i, Rxy), is overwritten with the current measured RSSI at receiver location Rxy from the j-th beam of the b-th BS on carrier frequency fi, RSSI(i, j, b, Rxy), and (c). The BS assignment includes assigning the b-th BS operating on the carrier frequency fi, given threshold Th(i,k), as the serving BS for the receiver location Rxy, Server(i, Th(i,k), Rxy)=b. From block 512, method 500 proceeds to block 516.

At block 514, the interference received at the location Rxy on carrier frequency fi is updated by adding the latest measured RSSI at receiver location Rxy from the j-th beam of the b-th BS on carrier frequency fi, RSSI(i, j, b, Rxy) to the stored interference level.

At block 516, a determination is made as to whether the index of the current steerable beam is less than the total number of beams Ni (j<Ni). If the index of the current steerable beam is less than the total number of beams Ni, method 500 proceeds to block 518. If the index of the current steerable beam is not smaller than the total number of beams Ni, method 500 proceeds to block 520.

At block 518, the next steerable beam on carrier frequency fi is selected (e.g., by incrementing the index j, j=j+1) and the Attach variable is reset (Attach(i, j, Th(i,k), b, Rxy)=0). From block 518, method 500 returns to block 504.

At block 520, a determination is made as to whether the index of the current BS, b-th, is smaller than the maximum number of BSs, B. If the index of the current BS, b-th, is smaller than the maximum number of BSs, B, method 500 proceeds to block 522. If the index of the current BS, b-th, is not smaller than the maximum number of BSs, B, method 500 proceeds to block 524.

At block 522, the index of the current BS under evaluation is incremented (b=b+1) and the beam index is reset (j=1). From block 522, method 500 returns to block 504.

At block 524, a determination is made as to whether the receiver location Rxy is being served by a BS on carrier frequency fi, assuming the current quality threshold Th(i,k), which may be denoted as (Server(i, Th(i,k), Rxy)>0). If the receiver location Rxy is being served by a BS on carrier frequency fi (Server(i, Th(i,k), Rxy)>0), method 500 proceeds to block 526. If the receiver location Rxy is not being served by a BS on carrier frequency fi (Server(i, Th(i,k), Rxy)=0), method 500 proceeds to block 534.

At block 526, the set of receiver locations that attach to carrier frequency fi, given quality threshold Th(i,k), which is denoted as U_Rx_fi(i, Th(i,k)), is updated to include the location Rxy illuminated on the carrier frequency fi. Additionally, the SINR at receiver location Rxy on carrier frequency fi, SINR(i, Rxy), is computed as SINR(i, Rxy)=Max_RSSI_Rxy(i, Rxy)/(NB_i+I(i, Rxy)), where Max_RSSI_Rxy(i, Rxy) is the maximum recorded value for the RSSI at receiver location Rxy on the carrier frequency fi, NB_i is the noise over the total available bandwidth BW_i on the carrier frequency fi, and I(i, Rxy) is the interference at the receiver location Rxy on the carrier frequency fi. From block 526, method 500 proceeds to block 528.

At block 528, a determination is made as to whether there is an active WCD (denoted as Ua, as the WCD also may be referred to as a user) at receiver location Rxy. If there is an active WCD Ua at receiver location Rxy, method 500 proceeds to block 530. If there is not an active WCD Ua at receiver location Rxy, method 500 proceeds to block 532.

At block 530, the set of active WCDs served on carrier frequency fi given quality threshold Th(i,k), which is denoted as U_fi(i, Th(i,k)), is updated to include the active WCD Ua. Additionally, the SINR for the WCD Ua, denoted as SINR_Ua, is set as the SINR at receiver location Rxy on carrier frequency fi, denoted as SINR(i, Rxy). From block 530, method 500 proceeds to block 532.

At block 532, the predicted data rate value, E_PR_fi(Rxy, Th(i,k)), for WCD(s) at receiver location Rxy that is served on carrier frequency fi given quality threshold Th(i,k) is computed. The predicted data rate value may be computed using any suitable data rate predictor. For example, where an assumption is made that the WCD located at receiver location Rxy is the only WCD that will use the available bandwidth, the Shannon formula may be used to compute the predicted data rate value as follows: E_PR_fi(Rxy, Th(i,k))=BW_i*log 2(1+SINR(i, Rxy)). It will be appreciated that various other data rate predictors may be used to compute the predicted data rate value (e.g., other predictors which may be based on the assumption that the WCD located at receiver location Rxy is the only WCD that will use the available bandwidth, other predictors which may not assume that the WCD located at receiver location Rxy is the only WCD that will use the available bandwidth, or the like). It is noted that the predicted data rate value is determined, because the reference performance metric that is to be used to evaluate the candidate assignments of the receiver locations to the respective carrier frequencies is based on data rate. It will be appreciated that, where the reference performance metric that is to be used to evaluate the candidate assignments of the receiver locations to the respective carrier frequencies is a different type of reference performance metric (e.g., throughput, latency, or the like), a different type of predicted reference performance metric value related to that different type of reference performance metric may be computed here. From block 532, method 500 proceeds to block 534 (for evaluation of each of the receiver locations Rxy with respect to any quality thresholds which have not yet been evaluated).

At block 534, a determination is made as to whether the index k of the current quality threshold Th(i,k) is smaller than the maximum considered quality threshold K (k<K) for carrier frequency fi. If the index k of the current quality threshold Th(i,k) is smaller than the maximum considered quality threshold K (k<K), method 500 proceeds to block 536. If the index k of the current quality threshold Th(i,k) is not smaller than the maximum considered quality threshold K (k=K), method 500 proceeds to block 538.

At block 536, the next quality threshold, Th(i, k+1), is selected while operating on carrier frequency fi (e.g., by incrementing the index k, k=k+1) and various indices and variables are reset. The BS index b is reset to one (b=1) and the beam index j is reset to one (j=1). The following variables are reset: Server(i, Th(i,k), Rxy)=0 and Rxy(i, Th(i,k))=OFF. From block 536, method 500 returns to block 504.

At block 538, a determination is made as to whether the current index, i, of the carrier frequency fi is smaller than the total number of carrier frequencies considered, F (i<F). If the current index, i, of the carrier frequency fi is smaller than the total number of carrier frequencies considered, F (i<F), method 500 proceeds to block 540. If the current index, i, of the carrier frequency fi is not smaller than the total number of carrier frequencies considered, F (i=F), method 500 proceeds to block 542.

At block 540, the next carrier frequency f(i+1) is selected (e.g., by incrementing the index i, i=i+1) and a number of indices and variables are reset. The threshold index k is reset to one (k=1), the BS index b is reset to one (b=1), the beam index j is reset to one (j=1), the interference received at the location Rxy on carrier frequency fi is reset to zero (I(i, Rxy)=0), and the maximum received RSSI value at the receiver location Rxy on carrier frequency fi is reset to zero (Max_RSSI_Rxy(i, Rxy)=0). From block 540, method 500 returns to block 504.

At block 542, a determination is made as to whether the current receiver location Rxy is the last receiver location to be considered (Rxy==Last). If the current receiver location Rxy is not the last receiver location to be considered (Rxy==Last), method 500 proceeds to block 544. If the current receiver location Rxy is the last receiver location to be considered (Rxy==Last), method 500 proceeds to block 599 (where method 500 ends).

At block 544, the next receiver location Rxy of the geographic region is selected and a number of indices and variables are reset. The carrier frequency index i is reset to one (i=1), the threshold index k is reset to one (k=1), the BS index b is reset to one (b=1), and the beam index j is reset to one (j=1). From block 544, method 500 returns to block 504.

At block 599, method 500 ends.

It will be appreciated that method 500 of FIGS. 5A and 5B may be adapted in various ways to improve assignment of receiver locations Rxy to carrier frequencies fi. In at least some embodiments, for example, when jointly determining assignment of receiver locations Rxy to carrier frequencies fi, certain aspects of the carrier frequencies fi may be taken into account. For example, assignment of receiver locations Rxy to carrier frequencies fi may be based on observations that shorter range propagation is achieved at higher carrier frequencies and that there is more capacity in carrier frequencies with more available bandwidth. In at least some embodiments, for example, method 500 of FIGS. 5A and 5B may be configured, based on such observations, by (1) starting with the highest carrier frequency band (shortest range communication) and ending with the lowest carrier frequency band (longest range communication) and (2) determining the range for the reference quality metric thresholds Th(i,k) used for evaluating the carrier frequencies fi based on the operational ranges of the carrier frequencies fi (e.g., where different carrier frequencies fi may have different ranges or sets of reference quality metric thresholds Th(i,k)). It is noted that such embodiments may be further understood by way of reference to FIG. 8. It will be appreciated that method 500 of FIGS. 5A and 5B may be adapted in other ways to improve assignment of receiver locations Rxy to carrier frequencies fi.

It will be appreciated that, following execution of method 500 of FIGS. 5A and 5B, for each carrier frequency fi, a set of candidate assignments of the receiver locations Rxy to the carrier frequency fi has been identified. The set of candidate assignments of the receiver locations Rxy to a given carrier frequency fi includes a candidate assignment for each of the reference quality metric thresholds (Th(i,k)) associated with the given carrier frequency fi. In other words, there is a candidate assignment of receiver locations Rxy for each reference quality metric threshold for each carrier frequency fi (i.e., for all (i, Th(i,k))). The candidate assignment of receiver locations Rxy for a given reference quality metric threshold Th(i,k) for a given carrier frequency fi includes the set of receiver locations Rxy that attach to carrier frequency fi given the reference quality metric threshold Th(i,k) (denoted as U_Rx_fi(i, Th(i,k)) and the set of active WCDs served on carrier frequency fi given the reference quality metric threshold Th(i,k) (denoted as U_fi(i, Th(i,k))). The candidate assignment of receiver locations Rxy for a given reference quality metric threshold Th(i,k) for a given carrier frequency fi also includes performance metric information for the given reference quality metric threshold Th(i,k) for a given carrier frequency fi (in the embodiments of FIGS. 5A and 5B, predicted data rate information per receiver location Rxy for each of the reference quality metric thresholds Th(i,k), which is denoted as E_PR_fi(Rxy, Th(i,k))) for use in evaluating the candidate assignments of receiver locations Rxy to the carrier frequencies fi. The candidate assignment of receiver locations Rxy for a given reference quality metric threshold Th(i,k) for a given carrier frequency fi also may include, for each receiver location Rxy, an indication of the base station and beam to which the receiver location Rxy may be attached (e.g., the set of Attach(i, j, Th(i,k), b, Rxy) values for the given reference quality metric threshold Th(i,k) for the given carrier frequency fi), which, in at least some embodiments, may be used to perform a more fine-grained configuration of the base stations to support the receiver locations Rxy. The candidate assignments of receiver locations Rxy to carrier frequencies fi also may include other information that is generated during execution of method 500 of FIGS. 5A and 5B. As noted above, an exemplary embodiment of a method for evaluating the candidate assignments of receiver locations Rxy to carrier frequencies fi determined by method 500 of FIGS. 5A and 5B is presented with respect to FIGS. 6A and 6B.

Figure 6B:
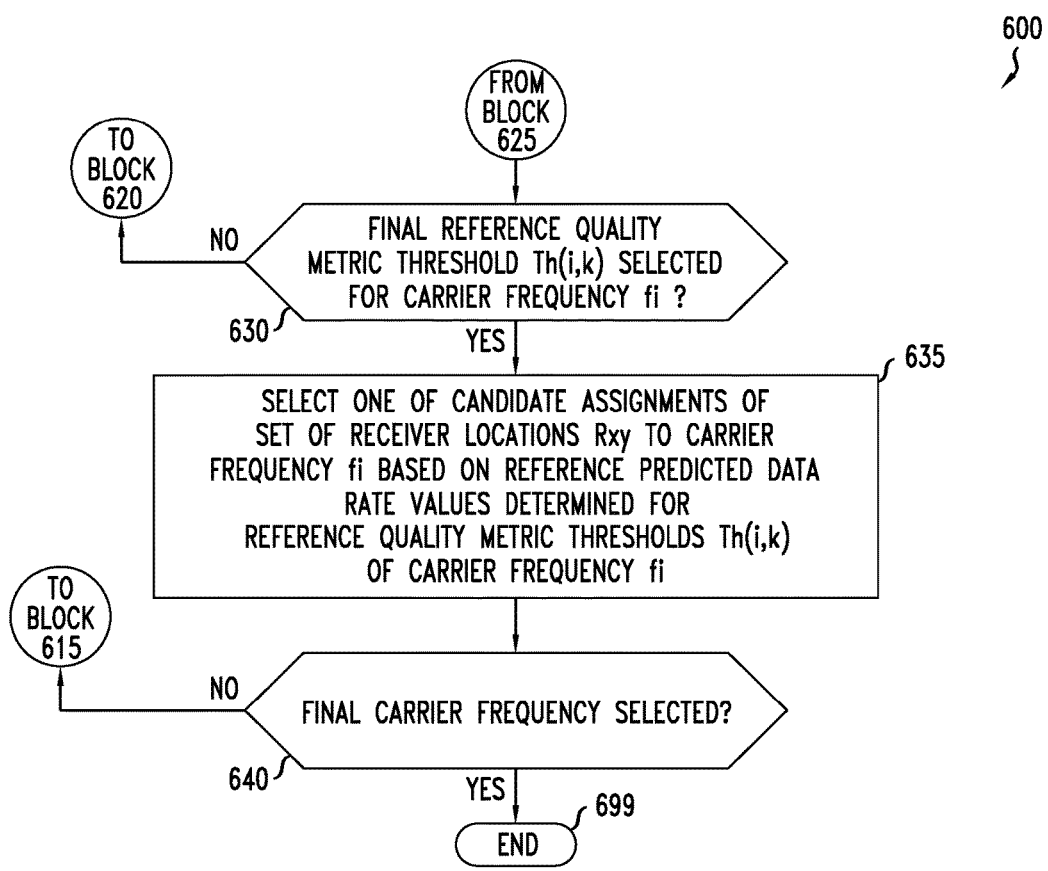

FIGS. 6A and 6B depict an embodiment of a method for evaluating candidate assignments of receiver locations to carrier frequencies based on a reference performance metric. It is noted that, for purposes of clarity, method 600 is configured to use a specific reference performance metric (namely, predicted data rate) that is evaluated using a specific reference performance metric evaluation type (namely, per active WCD) and a specific reference performance metric evaluation value (namely, 5% of the CDF) (although it will be appreciated that method 600 may be modified to use other reference performance metrics (e.g., throughput, latency, or the like), other reference performance metric evaluation types (e.g., per location, per base station, overall system level, or the like)), other reference performance metric evaluation levels (e.g., 50%, 95%, or the like), or the like, as well as various combinations thereof). It is noted that method 600 may be used to provide block 420 of method 400 of FIG. 4. It is noted that various types of information produced by execution of method 500 of FIGS. 5A and 5B may be used as input to method 600 of FIGS. 6A and 6B. It will be appreciated that, although primarily presented as being performed serially, at least a portion of the functions of method 600 may be performed contemporaneously or in a different order than as presented in FIGS. 6A and 6B.

At block 601, method 600 begins.

At block 605, a set of candidate assignments of a set of receiver locations Rxy to a set of carrier frequencies fi is received. The candidate assignment of receiver locations Rxy for a given reference quality metric threshold Th(i,k) for a given carrier frequency fi includes the set of receiver locations Rxy that attach to carrier frequency fi given the reference quality metric threshold Th(i,k) (denoted as U_Rx_fi(i, Th(i,k)) and the set of active WCDs served on carrier frequency fi given the reference quality metric threshold Th(i,k) (denoted as U_fi(i, Th(i,k))). The candidate assignment of receiver locations Rxy for a given reference quality metric threshold Th(i,k) for a given carrier frequency fi also includes reference performance metric information for the given reference quality metric threshold Th(i,k) for a given carrier frequency fi (in the embodiments of FIGS. 6A and 6B, predicted data rate values per receiver location Rxy, which are denoted as E_PR_fi(Rxy, Th(i,k)) for the reference quality metric thresholds Th(i,k) of the carrier frequencies) for use in evaluating the candidate assignments of receiver locations Rxy to the carrier frequencies fi. The set of candidate assignments of the receiver locations Rxy to the carrier frequencies fi may include various other types of information.

At block 610, a predicted data rate evaluation type and a predicted data rate evaluation level are selected as a basis for evaluating the candidate assignments of receiver locations Rxy to carrier frequencies fi. For purposes of clarity, it is assumed that a predicted data rate evaluation type of per active WCD is selected and that a predicted data rate evaluation level of 5% (e.g., optimized for cell edge) is selected; however, it will be appreciated that any other suitable predicted data rate evaluation types (e.g., per-BS or the like) or predicted data rate evaluation levels (e.g., 25%, 95%, or the like) may be selected as the basis for evaluating the candidate assignments of receiver locations Rxy to carrier frequencies fi using predicted data rate as the reference performance metric, depending on the type of performance that is desired or required for the system.

At block 615, a (next) carrier frequency fi is selected. The carrier frequency fi is indexed by i (i=1 to start and is incremented for each carrier frequency fi that is evaluated).

At block 620, a (next) reference quality metric threshold Th(i,k) of the selected carrier frequency fi is selected. The reference quality metric threshold Th(i,k) is indexed by i and k (k=1 to start and is incremented for each reference quality metric of the selected carrier frequency fi).

At block 625, a reference predicted data rate value is determined for the reference quality metric threshold Th(i,k) of the carrier frequency fi. The reference predicted data rate value is a reference predicted data rate per active WCD value as the predicted data rate evaluation type is per active WCD. The reference predicted data rate per active WCD value is determined based on the predicted data rate evaluation level (5%). The reference predicted data rate per active WCD value is determined using the predicted data rates values per receiver location Rxy for the reference quality metric threshold Th(i,k) of the carrier frequency fi (denoted as E_PR_fi(Rxy, Th(i,k))). The reference predicted data rate per active WCD value, as discussed further below, may be determined by determining a reference predicted data rate CDF and evaluating the reference predicted data rate CDF based on the predicted data rate evaluation level (5%). The reference predicted data rate per active WCD value may be determined in a number of ways. As discussed further below, the reference predicted data rate per active WCD values determined for the candidate assignments for the carrier frequency fi will be used to compare the candidate assignments for the carrier frequency fi in order to select one of the candidate assignments for the carrier frequency fi as the assignment of receiver locations Rxy to be used for the carrier frequency fi (or, stated differently, to select one of the reference quality metric thresholds Th(i,k) to be used for the carrier frequency fi in order to try to provide an attachment of the receiver locations Rxy to the carrier frequency fi that is consistent with the selected one of the candidate assignments for the carrier frequency fi).

In at least some embodiments, the reference predicted data rate per active WCD value (denoted as PR_U_5% (Th(i,k))) may be determined by determining a CDF(i,k) of the predicted data rate values for the reference quality metric threshold Th(i,k) of the carrier frequency fi using the predicted data rate values for the reference quality metric threshold Th(i,k) of the carrier frequency fi (the E_PR_fi (Rxy, Th(i,k)) values), evaluating the CDF(i,k) of the predicted data rate values for the reference quality metric threshold Th(i,k) of the selected carrier frequency fi at the predicted data rate evaluation level of 5% to determine a selected predicted data rate value (denoted as PR_5% (Th(i,k))), and dividing the selected predicted data rate value by the number of active WCDs served on carrier frequency fi given the reference quality metric threshold Th(i,k) (denoted as U(i, Th(i,k))) to obtain the reference predicted data rate per active WCD value (denoted as PR_U_5% (Th(i,k))) for the reference quality metric threshold Th(i,k) of the selected carrier frequency fi. This determination may be written as PR_U_5% (Th(i,k))=PR_5% (Th(i,k))/U(i, Th(i,k)).

Figure 7:
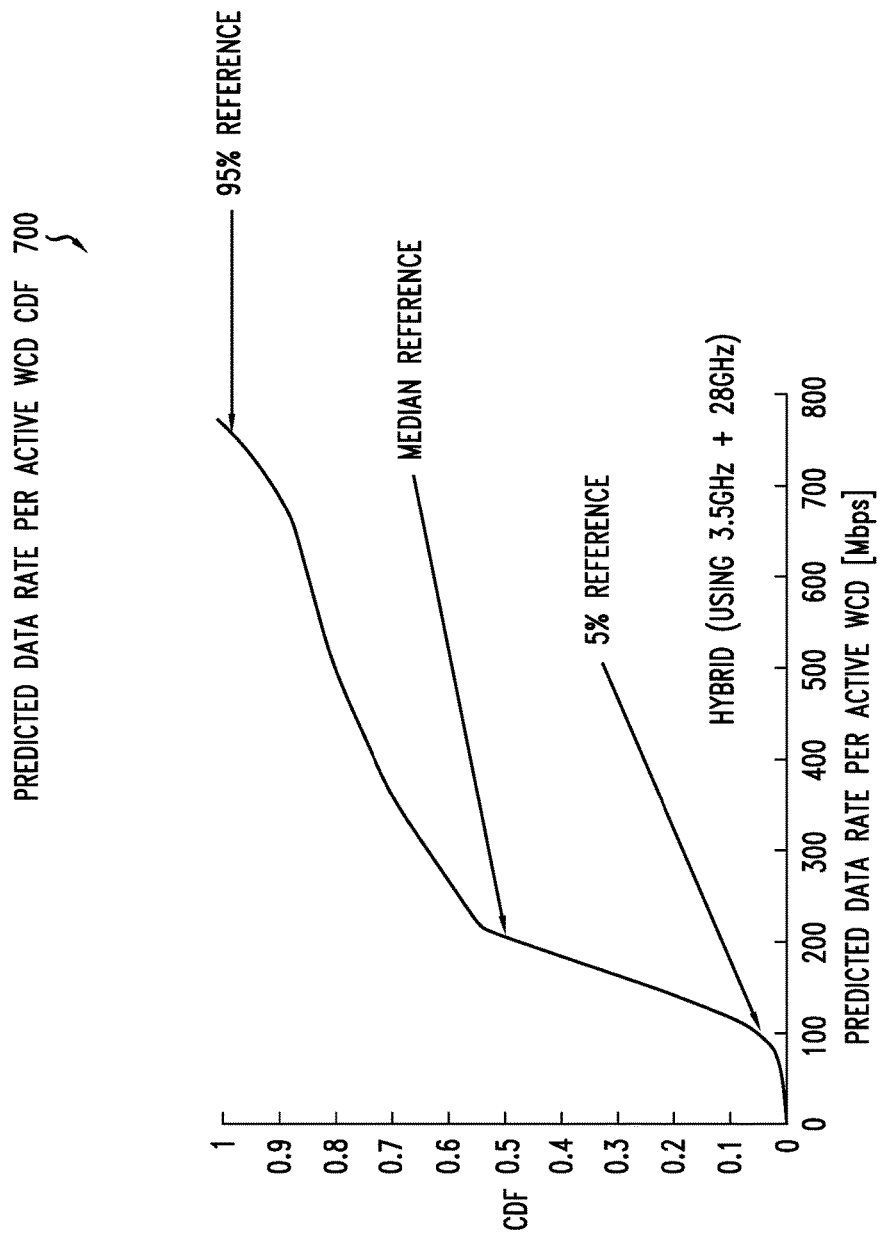
FIG. 7 depicts an exemplary cumulative distribution function for the predicted data rate per active wireless communication device for use in evaluating candidate assignments of receiver locations to carrier frequencies.

In at least some embodiments, the reference predicted data rate per active WCD value (denoted as PR_U_5% (Th(i,k))) may be determined by converting the predicted data rate values for the reference quality metric threshold Th(i,k) of the carrier frequency fi into respective predicted data rate per active WCD values for the reference quality metric threshold Th(i,k) of the carrier frequency fi based on the number of active WCDs served on carrier frequency fi given the reference quality metric threshold Th(i,k) (denoted as U(i, Th(i,k))), determining a CDF(i,k) of the predicted data rate per active WCD values for the reference quality metric threshold Th(i,k) of the carrier frequency fi, and evaluating the CDF(i,k) of the predicted data rate per active WCD values for the reference quality metric threshold Th(i,k) of the carrier frequency fi at the predicted data rate evaluation level of 5% to obtain the reference predicted data rate per active WCD value (again, denoted as PR_U_5% (Th(i,k))) for the reference quality metric threshold Th(i,k) of the selected carrier frequency fi. The predicted data rate values for the reference quality metric threshold Th(i,k) of the carrier frequency fi may be converted into the respective predicted data rate per active WCD values for the reference quality metric threshold Th(i,k) of the carrier frequency fi based on the number of active WCDs served on carrier frequency fi given the reference quality metric threshold Th(i,k) (denoted as U(i, Th(i,k))) by dividing each of the predicted data rate values by the number of active WCDs served on carrier frequency fi given the reference quality metric threshold Th(i,k) (denoted as U(i, Th(i,k))). An exemplary CDF of predicted data rate per active WCD values is presented with respect to FIG. 7. As depicted in FIG. 7, predicted data rate per active WCD CDF 700 is a curve plotted on a graph where the x-axis corresponds to the predicted data rate per active WCD values and the y-axis corresponds to the percentages of the CDF.

At block 630, a determination is made as to whether the final reference quality metric threshold Th(i,k) for the selected carrier frequency fi has been selected (e.g., a determination as to whether k<K for the selected carrier frequency fi). If the final reference quality metric threshold Th(i,k) for the selected carrier frequency fi has not been selected, method 600 returns to block 620 (at which point a next reference quality metric threshold Th(i,k) for the selected carrier frequency fi is selected, such as by incrementing k by one). If the final reference quality metric threshold Th(i,k) for the selected carrier frequency fi has been selected, method 600 proceeds to block 635.

At block 635, one of the candidate assignments of receiver locations Rxy to the selected carrier frequency fi is selected based on the respective reference predicted data rate per active WCD values (the PR_U_5% (Th(i,k)) value) determined for the reference quality metric thresholds Th(i, k) of the carrier frequency. The one of the candidate assignments of receiver locations Rxy to the selected carrier frequency fi may be selected based on a comparison of the respective reference predicted data rate per active WCD values determined for the reference quality metric thresholds Th(i,k) of the carrier frequency fi. In at least some embodiments, the one of the candidate assignments of receiver locations Rxy to the selected carrier frequency fi that is selected is the one of the candidate assignments of receiver locations Rxy to the selected carrier frequency fi that has the greatest reference predicted data rate per active WCD value. It will be appreciated that, although primarily described as a selection of one of the candidate assignments of receiver locations Rxy to the selected carrier frequency fi, this also may be considered to be selection of one of the reference quality metric thresholds Th(i,k) associated with the carrier frequency fi (e.g., since the selected one of the reference quality metric thresholds Th(i,k) may be applied on the base stations using that carrier frequency fi in order to try to provide an attachment of receiver locations Rxy to the carrier frequency fi that is consistent with the selected one of the candidate assignments for the carrier frequency fi).

At block 640, a determination is made as to whether the final carrier frequency fi has been selected (e.g., a determination as to whether i<I for the set of receiver locations Rxy). If the final carrier frequency fi has not been selected, method 600 returns to block 615 (at which point a next carrier frequency fi is selected, such as by incrementing i by one). If the final carrier frequency fi has been selected, method 600 proceeds to block 699.

At block 699, method 600 ends.

It will be appreciated that, although primarily presented with respect to embodiments in which the reference data rate CDFs are evaluated using a single reference performance metric evaluation level (illustratively, 5% of data rate), in at least some embodiments the reference data rate CDFs may be evaluated using a multiple reference performance metric evaluation levels (e.g., 5% of data rate and 95% of data rate, 5% of data rate and 50% of data rate, 5%, 50%, and 95% of data rate, or the like, as well as various combinations thereof). It will be appreciated that method 600 of FIGS. 6A and 6B may be modified to support such embodiments by adding an additional loop through block 610 for evaluating each of the candidate assignments of receiver locations Rxy to carrier frequencies fi for each of the multiple reference performance metric evaluation levels. It will be appreciated that method 600 of FIGS. 6A and 6B may be modified to support such embodiments by modifying the selection of the candidate assignments of receiver locations Rxy to the carrier frequencies fi to use results from evaluating the reference data rate CDFs using the multiple reference performance metric evaluation levels (selecting the highest from among the data sets from multiple reference performance metric evaluation levels, taking average values based on the data sets from multiple reference performance metric evaluation levels and selecting the highest from among the average values, or the like). It will be appreciated that method 600 of FIGS. 6A and 6B may be modified in various other ways to support such embodiments.

It will be appreciated that, although primarily presented with respect to embodiments in which the reference data rate CDFs are evaluated using a single reference performance metric evaluation type (illustratively, predicted data rate per active WCD), in at least some embodiments the reference data rate CDFs may be evaluated using multiple reference performance metric evaluation types (e.g., predicted data rate per active WCD and predicted data rate per BS). It will be appreciated that method 600 of FIGS. 6A and 6B may be modified to support such embodiments by adding an additional loop through block 610 for evaluating each of the candidate assignments of receiver locations Rxy to carrier frequencies fi for each of the multiple reference performance metric evaluation types. It will be appreciated that method 600 of FIGS. 6A and 6B may be modified to support such embodiments by modifying the selection of the candidate assignments of receiver locations Rxy to the carrier frequencies fi to use results from evaluating the reference data rate CDFs using the multiple reference performance metric evaluation types. It will be appreciated that method 600 of FIGS. 6A and 6B may be modified in various other ways to support such embodiments.

It will be appreciated that, following execution of method 600 of FIGS. 6A and 6B, for each carrier frequency fi, a candidate assignment of the receiver locations Rxy to the carrier frequency fi has been selected and, further, has associated therewith a reference quality metric threshold Th(i,k) for the carrier frequency fi. As discussed herein, the reference quality metric thresholds Th(i,k) for the carrier frequencies fi, which are associated with the selected assignments of the receiver locations Rxy to the carrier frequencies fi, may then be used to configure the carrier frequencies fi on the base stations such that the receiver locations Rxy may be attached to the carrier frequencies and, therefore, may receive wireless broadband connectivity using the carrier frequencies fi. As also described herein, more fine-grained control over configuration of base stations also may be provided (e.g., based on details of the selected assignments of the receiver locations Rxy to the carrier frequencies fi, such as by using associated attachment information associated with the selected assignments of the receiver locations Rxy to the carrier frequencies fi (e.g., the set of Attach(i, j, Th(i,k), b, Rxy) values for the given reference quality metric threshold Th(i,k) for the given carrier frequency fi)). An exemplary embodiment of a method for configuring base stations based on selected assignments of the receiver locations Rxy to carrier frequencies fi is presented with respect to FIG. 8.

Figure 8:
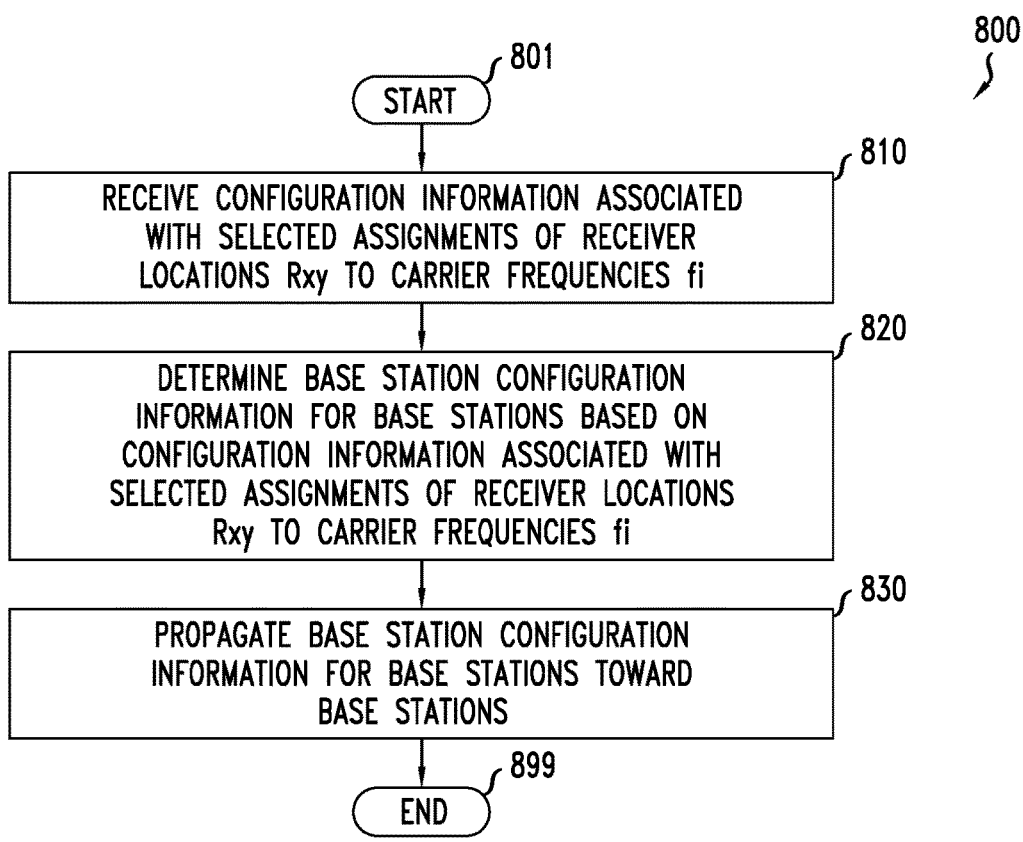
FIG. 8 depicts an embodiment of a method for configuring base stations based on assignments of receiver locations to carrier frequencies.

FIG. 8 depicts an embodiment of a method for configuring base stations based on assignments of receiver locations to carrier frequencies. It is noted that method 800 may be used to provide block 320 of method 300 of FIG. 3. It will be appreciated that, although primarily presented as being performed serially, at least a portion of the functions of method 800 may be performed contemporaneously or in a different order than as presented in FIG. 8.

At block 801, method 800 begins.

At block 810, configuration information associated with selected assignments of receiver locations Rxy to carrier frequencies fi is received. The configuration information associated with selected assignments of receiver locations Rxy to carrier frequencies fi includes, for each of the carrier frequencies fi, an indication of which of the reference quality metric thresholds is to be used on the respective carrier frequency fi. The configuration information associated with selected assignments of receiver locations Rxy to carrier frequencies fi also may include attachment information associated with the selected assignments of receiver locations Rxy to the carrier frequencies fi (e.g., the set of Attach(i, j, Th(i,k), b, Rxy) values for each of the reference quality metric thresholds Th(i,k) associated with the selected assignments for the respective carrier frequencies fi)), such as where more fine-grained control over configuration of base stations is to be provided.

At block 820, for each of the base stations, associated base station configuration information is determined for the base station based on the configuration information associated with selected assignments of receiver locations Rxy to carrier frequencies fi. The base station configuration information for a base station includes, for each carrier frequency fi to be used by the base station, an indication of the reference quality metric threshold Th(i,k) that is to be used by the base station on the respective carrier frequency fi. The base station configuration information for a base station may include, for each carrier frequency fi to be used by the base station, one or more of an indication of a number of beams to be used on the carrier frequency fi, a total transmit power to be used on the beams to be used on the carrier frequency fi, or the like, as well as various combinations thereof. The base station configuration information for a base station may include, for each beam to be illuminated by the base station, one or more beam characteristics for controlling illumination of the beam (e.g., power P(i,j) for the beam, directivity gain G(i,j) for the beam, angular width A(i,j) for the beam, azimuth Az(i,j) for the beam, tilt Tilt(i,j) for the beam, or the like, as well as various combinations thereof). It will be appreciated that, as discussed herein, various levels of granularity of control over configuration of the base stations may be provided (e.g., from simply setting reference quality metric thresholds Th(i,k) to be used for the carrier frequencies fi and letting receiver locations Rxy attach to the base stations based on the reference quality metric thresholds Th(i,k) and pre-configured beam control capabilities of the base stations to actively configuring base stations in a manner for ensuring controlled illumination of receiver locations Rxy based on base station configuration information). It is noted that an exemplary embodiment of setting reference quality metric thresholds Th(i,k) to be used for the carrier frequencies fi and letting receiver locations Rxy attach to the base stations based on the reference quality metric thresholds Th(i,k) and pre-configured beam control capabilities of the base stations is presented, over multiple time frames, with respect to FIG. 9. In at least some embodiments, each receiver location Rxy attaches to and is served by a single carrier frequency fi (e.g., based on careful selection of the reference quality metric thresholds Th(i,k) for the carrier frequencies fi, based on one or more carrier attachment rules, or the like, as well as various combinations thereof). In at least some embodiments, one or more of the receiver locations Rxy may attach to and be served by multiple carrier frequencies fi (e.g., based on careful selection of the reference quality metric thresholds Th(i,k) for the carrier frequencies fi, based on one or more carrier attachment rules, based on more fine-grained control over attachment of receiver locations Rxy to specific beams of specific base stations, or the like, as well as various combinations thereof).

At block 830, the base station configuration information for the base stations is propagated toward the base stations. The base station configuration information determined for the base stations is configured for use by the base stations to configure themselves based on the selected assignments of receiver locations Rxy to carrier frequencies fi.

At block 899, method 800 ends.

As discussed herein, configuration of base stations to attach receiver locations to carrier frequencies may be performed based on various temporal considerations (e.g., over various time scales, based on various schedules, responsive to various conditions, or the like, as well as various combinations thereof) and at various granularities. An exemplary embodiment of setting reference quality metric thresholds Th(i,k) to be used by base stations for carrier frequencies fi over multiple time frames is presented with respect to FIG. 9.

Figure 9:
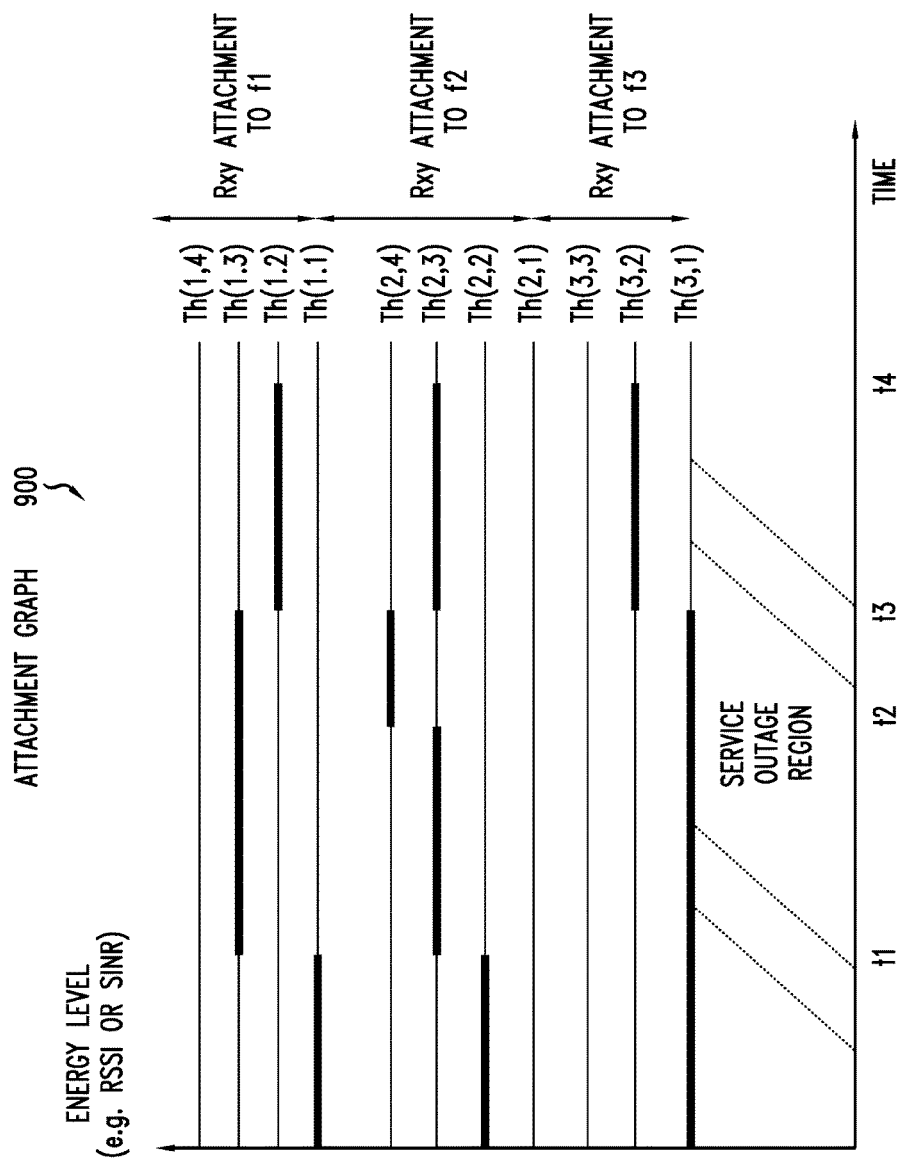
FIG. 9 depicts an attachment graph illustrating exemplary reference quality metric threshold settings for attachment of receiver locations to carrier frequencies over time.

FIG. 9 depicts an attachment graph illustrating exemplary reference quality metric threshold settings for attachment of receiver locations to carrier frequencies over time.

As depicted in FIG. 9, attachment graph 900 illustrates attachment of receiver locations Rxy using three carrier frequencies fi (illustratively, f1, f2, and f3). The arrows on the right-hand side of attachment graph 900 indicate the zones of attachment of receiver locations Rxy to carrier frequencies f1, f2, and f3. The three carrier frequencies fi have different sets of quality thresholds associated therewith (illustratively, quality thresholds Th(1,1), Th(1,2), Th(1,3), and Th(1,4) for carrier frequency f1, quality thresholds Th(2,1), Th(2,2), Th(2,3), and Th(2,4) for carrier frequency f2, and quality thresholds Th(3,1), Th(3,2), and Th(3,3) for carrier frequency f3). The carrier frequency f1 is the highest frequency band and, thus, its associated quality thresholds for attachment of receiver locations Rxy are the highest (due to the shortest range communication at this carrier frequency relative to the other two carrier frequencies). Reciprocally, the carrier frequency f3 is the lowest frequency band and, thus, its associated quality thresholds for attachment of receiver locations Rxy are the lowest (due to the better radio propagation compared to the other two carrier frequencies). It is noted that, as discussed above, receiver locations Rxy not receiving sufficient energy to sustain required services would fall in service outage (a statistic that generally must be reduced or minimized).

As depicted in FIG. 9, attachment graph 900 also illustrates attachment of receiver locations Rxy using three carrier frequencies fi where the quality thresholds associated with the carrier frequencies fi may be changed over time.

At first, before time t1, the system operates with quality threshold Th(3,1) on carrier frequency f3, quality threshold Th(2,2) on carrier frequency f2, and quality threshold Th(1,1) on carrier frequency f1.

Then, between times t1 and t2, the system operates with quality threshold Th(3,1) on carrier frequency f3, quality threshold Th(2,3) on carrier frequency f2, and quality threshold Th(1,3) on carrier frequency f1. This may correspond to an increase load on frequency carrier f1 and eventually f2, or simply to a measured service degradation on these frequencies, and the system self-adjusts by raising the value of the quality thresholds to reduce the load on carrier frequencies f1 and f2 by directing more volume of incoming traffic to carrier frequency f3.

Then, between times t2 and t3, the system operates with quality threshold Th(3,1) on carrier frequency f3, quality threshold Th(2,4) on carrier frequency f2, and quality threshold Th(1,3) on carrier frequency f1. In this case, the admission of new flows on carrier frequency f2 would be further limited compared to the previous interval between times t1 and t2.

Then, between times t3 and t4 the system operates with quality threshold Th(3,2) on carrier frequency f3, quality threshold Th(2,3) on carrier frequency f2, and quality threshold Th(1,2) on carrier frequency f1. This may be based on a determination that carrier frequencies f1 and f2 are able to accept more traffic flows based on the measurements operated over the previous interval between t2 and t3. On the other hand, the quality on the carrier frequency f3 may have gotten noticeably poor and, in order to control the quality of accepted flows, the links which are below Th(3,2) in RSSI will not be accepted during this time interval (this may result in temporal delayed admission or even blocking of some flows).

It will be appreciated that, at least from the examples of FIG. 9, that the system that is providing broadband wireless communication to the geographic region of the receiver locations may be monitored and tuned in various ways. For example, all or part of method 500 of FIG. 5 may be executed (or modified and executed) based on detection of various conditions related to the operation of the system that is providing broadband wireless communication to the geographic region of the receiver locations. For example, all or part of method 500 of FIGS. 5A and 5B may be executed (or modified and executed) based on detection of various conditions related to the operation of the system that is providing broadband wireless communication to the geographic region of the receiver locations. For example, all or part of method 500 of FIGS. 5A and 5B may be executed (and, optionally, also modified, such as in terms of the number of quality thresholds used for one or more of the carrier frequencies, the values of quality thresholds used for one or more of the carrier frequencies, or the like, as well as various combinations thereof) responsive to various conditions. For example, method 500 of FIGS. 5A and 5B may be repeated either fully (all blocks executed) or just partially (only some blocks executed, such as, for instance, by tuning the quality thresholds for a subset of the carrier frequencies) each time a significant deviation from the expected performance is noticed (e.g., as conveyed in FIG. 9 at times t1, t2, t3, and t4). The conditions may be detected based on monitoring of various aspects of the system providing broadband wireless communication to the geographic region of the receiver locations being served.

As discussed herein, use of a hybrid wireless communication system utilizing multiple radio spectrum bands (and multiple associated carrier frequencies) to provide wireless broadband connectivity may involve various types of communications between various elements of the hybrid wireless communication system. For example, such communications may include messages associated with collection of quality measurement information which may be used to determine assignment of receiver locations to the carrier frequencies (e.g., messages from the wireless communications controller to wireless network access devices (primarily referred to herein as BSs) to cause the wireless network access devices to initiate collection of quality measurement information from communication gateways (primarily referred to herein as WCDs), messages from wireless network access devices to communication gateways to trigger the communication gateways to perform quality measurements based on wireless signals from the wireless network access devices, messages from communication gateways to wireless network access devices for reporting quality measurements determined by the communication gateways based on wireless signals from the wireless network access devices, or the like), messages associated with configuration of the elements of the hybrid wireless communication system to support communication using the carrier frequencies (e.g., messages from the wireless communications controller to wireless network access devices for configuring the wireless network access devices to support the assignments of communication gateways to wireless network access devices, messages from the wireless communications controller to communication gateways (via the wireless network access devices) for configuring the communication gateways to communicate using the assignments of communication gateways to wireless network access devices, messages from the wireless network access devices to the communication gateways for configuring the communication gateways to communicate using the assignments of communication gateways to wireless network access devices, or the like), communication of traffic between the wireless network access devices and the communication gateways using the carrier frequencies, or the like, as well as various combinations thereof. These and various other communications may be supported using various communication elements and associated communication interfaces of the communication elements as depicted in FIG. 10.

Figure 10:
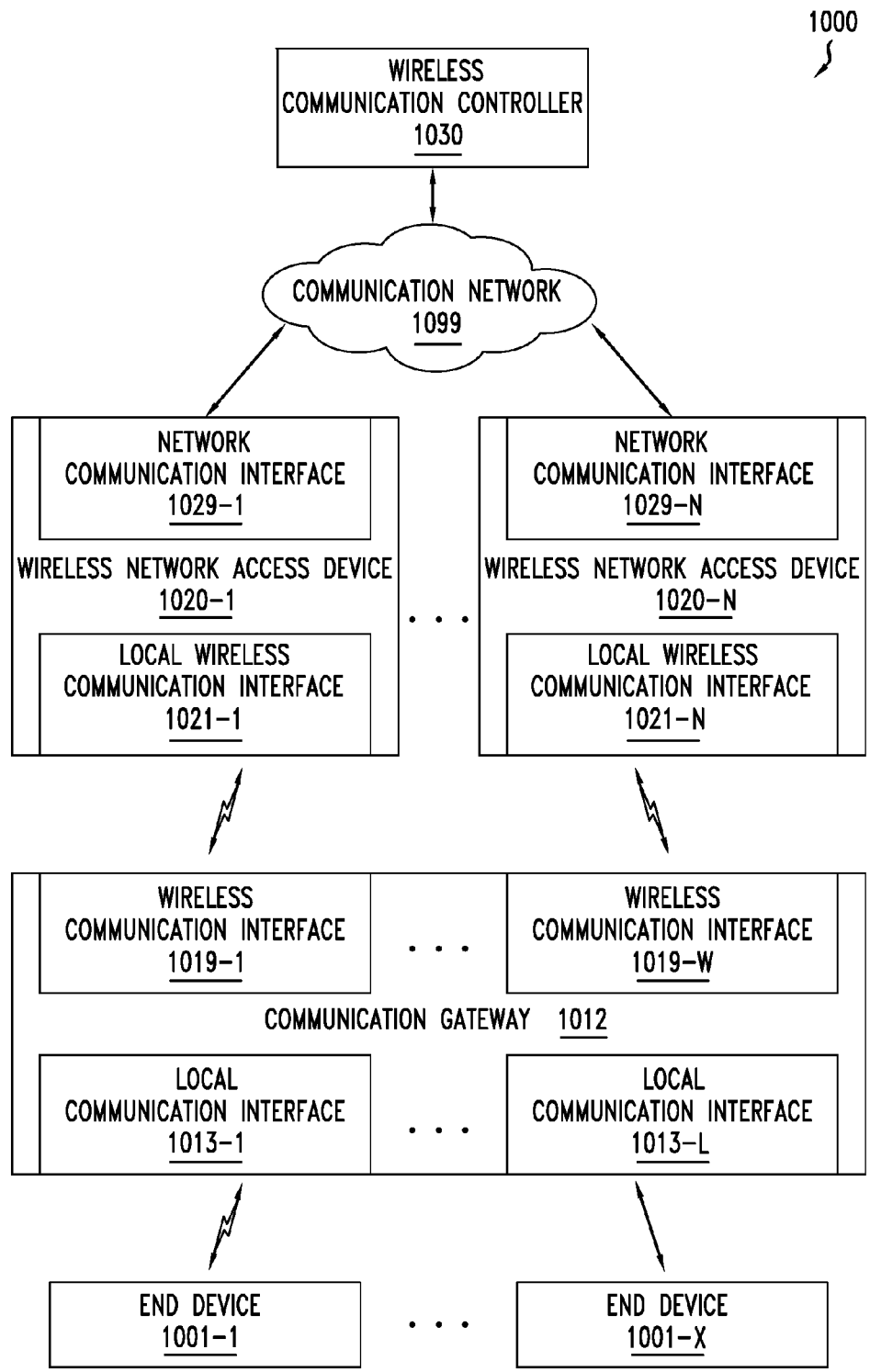
FIG. 10 depicts a communication system including communication elements of the hybrid wireless communication system of FIG. 1 for illustrating communication between the communication elements of the hybrid wireless communication system of FIG. 1.

FIG. 10 depicts a communication system including communication elements of the hybrid wireless communication system of FIG. 1 for illustrating communication between the communication elements of the hybrid wireless communication system of FIG. 1.

As depicted in FIG. 10, the communication system 1000 includes a communication gateway 1012, a set of wireless network access devices 1020-1-1020-N (collectively, wireless network access devices 1020), and a wireless communication controller (WCC) 1030. The communication gateway 1012 may be configured to support a set of end devices 1001-1-1001-X (collectively, end devices 1001). The communication gateway 1012 may be a WCD 112 as presented with respect to FIG. 1 and, similarly, the end devices 1001 may be end devices 113 as presented with respect to FIG. 1. The wireless network access devices 1020 may be configured to support the communication gateway 1012 (as well as various other communication gateways which have been omitted from FIG. 10 for purposes of clarity). The wireless network access devices 1020 may be BSs 120 as presented with respect to FIG. 1 (or other suitable types of wireless network access devices). The WCC 1030 may be configured to support wireless communications by the wireless network access devices 1020 and the communication gateway 1012 (and, thus, also to support communications of the end devices 1001). The WCC 1030 may be WCC 130 as presented with respect to FIG. 1. The communication system 1000 is configured to support wireless communications, between the wireless network access devices 1020 and the communication gateway 1012, using a set of carrier frequencies including at least a first carrier frequency and a second carrier frequency (e.g., a low frequency carrier and a high frequency carrier).

The communication gateway 1012 is configured to support communications of end devices 1001 via wireless communication with wireless network access devices 1020. The communication gateway 1012 includes a set of local communication interfaces 1013-1-1013-L (collectively, local communication interfaces 1013) configured to support communications between the communication gateway 1012 and the end devices 1001. The set of local communication interfaces 1013 may include one or more communication interfaces (i.e., L≥1). The set of local communication interfaces 1013 may include fewer or more communication interfaces than there are end devices 1001 at the location at which the communication gateway 1012 is deployed. The set of local communication interfaces 1013 may include one or more wired communication interfaces supporting one or more wired communications technologies (e.g., Ethernet, USB, S-video, or the like). The local communication interfaces 1013 may support one or more associated wired communication protocols (e.g., an Ethernet protocol, a USB protocol, an S-video protocol, or the like). The set of local communication interfaces 1013 may include one or more wireless communication interfaces supporting one or more wireless communication technologies (e.g., Wi-Fi, Bluetooth, Zigbee, or the like). The local communication interfaces 1013 may support one or more associated wireless communication protocols (e.g., a Wi-Fi protocol, a Bluetooth protocol, a Zigbee protocol, or the like). The communication gateway 1012 includes a set of wireless communication interfaces 1019-1-1019-W (collectively, wireless communication interfaces 1019) configured to support wireless communications between the communication gateway 1012 and wireless network access devices 1020 using the set of carrier frequencies. The wireless communication interfaces 1019 may be configured to support any suitable wireless network access technologies (e.g., cellular-based access or the like). The communication gateway 1012 is configured to support conversion of communications associated with the end devices 1001 between one or more protocols of local communication interfaces 1013 and one or more wireless protocols of the wireless communication interfaces 1019. The communication gateway 1012 is configured to support conversion of communications for various combinations of end devices 1001 supported by the local communication interfaces 1013 and the carrier frequencies supported on the wireless communication interfaces 1019. It will be appreciated that communication gateway 1012 may include various other elements and devices configured to support communications via the local communication interfaces 1013 and the wireless communication interfaces 1019 (e.g., transmitters, receivers, transceivers, radios, antennas, processors, memories, controllers, or the like, as well as various combinations thereof), which have been omitted from FIG. 10 for purposes of clarity.

The wireless network access devices 1020 are configured to support wireless communications of communication gateway 1012. The wireless network access devices 1020-1-1020-N each include a set of one or more local wireless communication interfaces 1021-1-1021-N (collectively, local wireless communication interface sets 1021), respectively, which are configured to support wireless communications of the communication gateway 1012 using the set of carrier frequencies. For example, as discussed with respect to the BSs 120 of FIG. 1, each of the local wireless communication interface sets 1021-1-1021-N of the wireless network access devices 1020-1-1020-N, respectively, may include one or more transceivers (e.g., including one or more associated radios) configured to support communications using the set of carrier frequencies or a portion of the set of carrier frequencies. The wireless network access devices 1020-1-1020-N include network communication interfaces 1029-1-1029-N (collectively, network communication interfaces 1029), respectively, which are configured to support communications upstream of the wireless network access devices 1020-1-1020-N, respectively. The network communication interfaces 1029 of the wireless network access devices 1020 are depicted as being connected to a communication network 1099. The communication network 1099 may be any suitable network or combination of networks which may support communication of control messages between the WCC 1030 and the wireless network access devices 1020, communication of traffic of the end devices 1013 supported by the communication gateway 1012, and so forth. For example, communication network 1099 may include a wireless core network, one or more private data networks (e.g., one or more data center networks, one or more enterprise networks, one or more provider networks, or the like), one or more public data networks (e.g., the Internet), or the like, as well as various combinations thereof. The network communication interfaces 1029 may include wireline communication interfaces, wireless communication interfaces, or combinations thereof. It will be appreciated that each of the wireless network access devices 1020 may include various other elements and devices configured to support communications on the local wireless communication interface sets 1021 and the network communication interfaces 1029 (e.g., transmitters, receivers, transceivers, radios, antennas, processors, memories, or the like, as well as various combinations thereof), which have been omitted from FIG. 10 for purposes of clarity.

The WCC 1030 may be configured to control configuration of the wireless network access devices 1020 and the communication gateway 1012 to support wireless communications of the communication gateway 1012 (and, thus, also to support communications of the end devices 1001. The WCC 1030, as discussed above, may communicate with the wireless network access devices 1020 via the communication network 1099.

Figure 11:
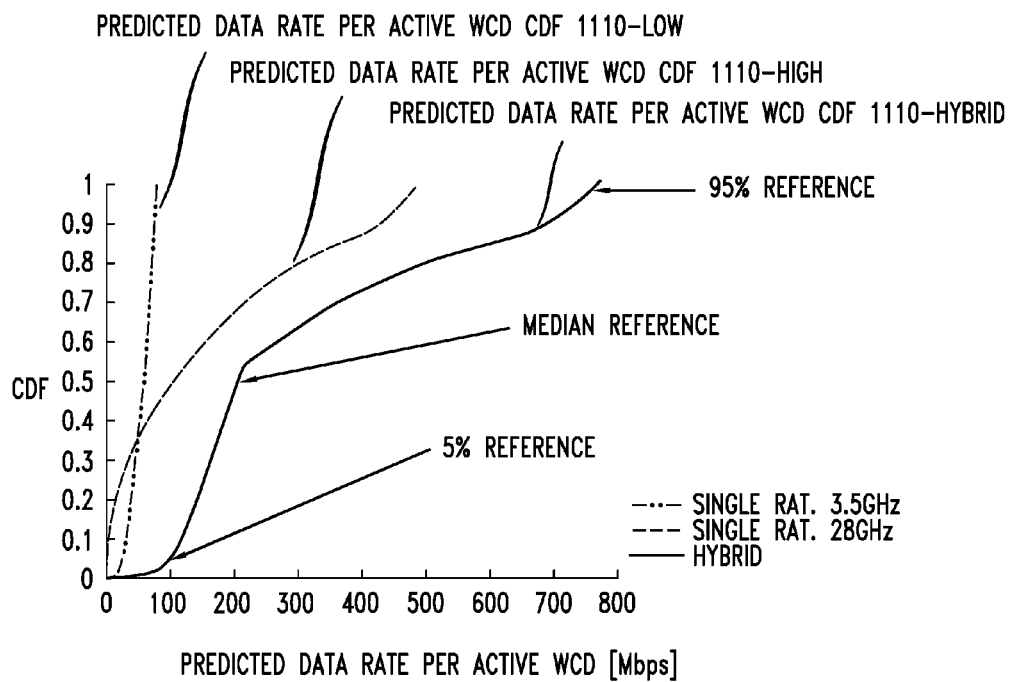
FIG. 11 depicts information related to a comparison of a hybrid implementation using two carrier frequencies to two single carrier frequency implementations.

As discussed herein, a hybrid wireless communication system supporting wireless broadband connectivity utilizes multiple radio spectrum bands (and associated carrier frequencies) to improve wireless broadband connectivity. As discussed herein, use of a hybrid wireless communication system that utilizes multiple radio spectrum bands (and associated carrier frequencies) to improve wireless broadband connectivity is expected to provide improved performance over use of a single radio spectrum bands. The improvements in performance for a particular implementation are depicted in FIG. 11. FIG. 11 depicts performance information related to a comparison of a hybrid implementation using two carrier frequencies to two single carrier frequency implementations. FIG. 11 illustrates performance information for a particular implementation of a hybrid wireless communication system in which the set of carrier frequencies includes a low carrier frequency at or near 3.5 GHz (which has approximately 40 MHz of spectrum available) and a high carrier frequency at or near 28 GHz (which has approximately 250 MHz of spectrum available). FIG. 11 illustrates that a hybrid multi-carrier wireless communication system is expected to significantly outperform a single-carrier wireless communication system. FIG. 11 includes a set of predicted data rate per active WCD CDFs 1110 including a predicted data rate per active WCD CDF 1010—low for a single-carrier implementation using low carrier frequency at or near 3.5 GHz (which has approximately 40 MHz of spectrum available), a predicted data rate per active WCD CDF 1010—high for a single-carrier implementation using a high carrier frequency at or near 28 GHz (which has approximately 250 MHz of spectrum available), and a predicted data rate per active WCD CDF 1010—hybrid for a hybrid implementation using a combination of a low carrier frequency at or near 3.5 GHz (which has approximately 40 MHz of spectrum available) and a high carrier frequency at or near 28 GHz (which has approximately 250 MHz of spectrum available). FIG. 11 also includes a table 1120 including values from the set of predicted data rate per active WCD CDFs 1110. It will be appreciated that the level of performance improvement depicted in FIG. 11 is merely exemplary based on the assumptions used in FIG. 11, and that actual performance may be lower or higher based on various factors.

It will be appreciated that, although primarily presented herewith with respect to use of specific terms, applicability of various embodiments may be more general than as indicated by those specific terms. For example, although primarily presented herein with respect to use of the term receiver locations to refer to the geographic locations receiving wireless broadband connectivity based on embodiments of the hybrid wireless communications capability, it will be appreciated that at least some of the receiver locations also may transmit data via the wireless uplink and, thus, that in at least some embodiments the term receiver locations may be read more generally as being locations. For example, although primarily presented herein with respect to use of the term base stations to refer to the elements providing wireless broadband connectivity based on embodiments of the hybrid wireless communications capability, it will be appreciated that at least some of the elements providing wireless broadband connectivity may not be considered to be base stations and thus, that in at least some embodiments the term base stations may be read more generally as being wireless network access devices. It will be appreciated that, in at least some embodiments, other related terms used herein also may be read more generally.

Figure 12:
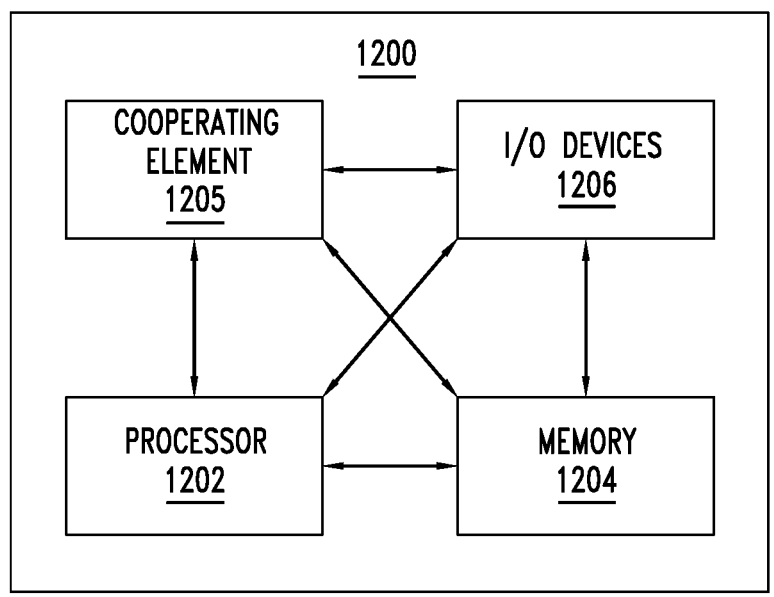
FIG. 12 depicts a high-level block diagram of a computer suitable for use in performing various functions described herein.

FIG. 12 depicts a high-level block diagram of a computer suitable for use in performing various functions described herein.

The computer 1200 includes a processor 1202 (e.g., a central processing unit (CPU), a processor having a set of processor cores, a processor core of a processor, or the like) and a memory 1204 (e.g., a random access memory (RAM), a read only memory (ROM), or the like). The processor 1202 and the memory 1204 are communicatively connected.

The computer 1200 also may include a cooperating element 1205. The cooperating element 1205 may be a hardware device. The cooperating element 1205 may be a process that can be loaded into the memory 1204 and executed by the processor 1202 to implement functions as discussed herein (in which case, for example, the cooperating element 1205 (including associated data structures) can be stored on a computer-readable storage medium, such as a storage device or other storage element (e.g., a magnetic drive, an optical drive, or the like)).

The computer 1200 also may include one or more input/output devices 1206. The input/output devices 1206 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1200 of FIG. 12 may represent a general architecture and functionality suitable for implementing functional elements described herein, portions of functional elements described herein, or the like, as well as various combinations thereof. For example, computer 1200 may provide a general architecture and functionality that is suitable for implementing one or more of an element of a WCD 112, an end device 113, a BS 120, a WCC 130, an end device 1001, a communication gateway 1012, a wireless network access device 1020, a WCC 1030, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A gateway apparatus, comprising:
    a first interface configured to support communications of an end-user device which are in a first protocol;
    a second interface configured to support wireless communications, which are in a second protocol, using a set of carrier frequencies including a first carrier frequency and a second carrier frequency; and
    a processor communicatively connected to the first interface and the second interface, the processor configured to:
       detect a first wireless signal from a wireless network access device received over the first carrier frequency;
       propagate through the second interface, toward the wireless network access device, a first quality measurement associated with the first wireless signal;
       detect a second wireless signal from the wireless network access device received over the second carrier frequency;
       propagate through the second interface, toward the wireless network access device, a second quality measurement associated with the second wireless signal; and
       convert communications of the end-user device received through the first interface which are in the first protocol to wireless communications which are in the second protocol.

2. The gateway apparatus of claim 1, wherein the first wireless signal comprises a first control signal and the second wireless signal comprises a second control signal.

3. The gateway apparatus of claim 2, wherein at least one of the first control signal or the second control signal comprises a reference signal, a pilot signal, or a preamble.

4. The gateway apparatus of claim 1, wherein the first quality measurement and the second quality measurement comprise respective Received Signal Strength Indicator (RSSI) measurements or respective Signal to Interference and Noise Ratio (SINR) measurements.

5. The gateway apparatus of claim 1, wherein the processor is configured to:
    receive, from the wireless network access device, a configuration message comprising an indication that the gateway apparatus is to communicate with the wireless network access device using at least one of the first carrier frequency or the second carrier frequency; and
    configure the gateway apparatus based on the configuration message.

6. The gateway apparatus of claim 1, wherein the processor is configured to:
    receive, from a second wireless network access device, a configuration message comprising an indication that the gateway apparatus is to communicate with the second wireless network access device using at least one of the first carrier frequency or the second carrier frequency; and
    configure the gateway apparatus based on the configuration message.

7. The gateway apparatus of claim 1, wherein the processor is configured to:
    receive, from the wireless network access device, a first configuration message comprising an indication that the gateway apparatus is to communicate with the wireless network access device using only the first carrier frequency;
    receive, from a second wireless network access device, a second configuration message comprising an indication that the gateway apparatus is to communicate with the second wireless network access device using only the second carrier frequency; and
    configure the gateway apparatus based on the first configuration message and the second configuration message.

8. The gateway apparatus of claim 1, wherein the processor is configured to:
    propagate, through the second interface using the first carrier frequency, the wireless communications which are in the second protocol;
    convert second communications of a second end-user device received through the first interface which are in the first protocol to second wireless communications which are in the second protocol; and
    propagate, through the second interface using the second carrier frequency, the second wireless communications which are in the second protocol.

9. The gateway apparatus of claim 1, wherein the processor is configured to:
    convert wireless communications intended for the end-user device received through the second interface which are in the second protocol to communications which are in the first protocol.

10. The gateway apparatus of claim 9, wherein the processor is configured to:
    propagate, through the first interface, the communications which are in the first protocol;
    convert second wireless communications intended for a second end-user device received through the second interface which are in the second protocol to second communications which are in the first protocol; and
    propagate, through the first interface, the second communications which are in the first protocol.

11. The gateway apparatus of claim 10, wherein the wireless communications intended for the end-user device are received over the first carrier frequency and the second wireless communications intended for the second end-user device are received over the second carrier frequency.

12. The gateway apparatus of claim 1, wherein the first carrier frequency comprises a high frequency carrier and the second carrier frequency comprises a low frequency carrier.

13. The gateway apparatus of claim 12, wherein at least one of the high frequency carrier is centered at or near 28 GHz or the low frequency carrier is centered at or near 3.5 GHz.

14. The gateway apparatus of claim 1, wherein the first interface comprises a wireless interface.

15. The gateway apparatus of claim 1, wherein the first interface comprises a wired interface.

16. The gateway apparatus of claim 1, wherein the first protocol comprises a Wi-Fi protocol or an Ethernet protocol.

17. The gateway apparatus of claim 1, wherein the second interface is configured to support cellular communications.

18. The gateway apparatus of claim 1, wherein the second protocol comprises a cellular protocol.

19. A wireless network access device, comprising:

an interface configured to support wireless communications using a set of carrier frequencies including a first carrier frequency and a second carrier frequency; and a processor communicatively connected to the interface, the processor configured to:

activate a first wireless signal at a location, through the interface, using the first carrier frequency;

receive, from a gateway at the location, a first quality measurement associated with the first wireless signal activated at the location using the first carrier frequency;

activate a second wireless signal at the location, through the interface, using the second carrier frequency; and receive, from the gateway at the location, a second quality measurement associated with the second wireless signal activated at the location using the second carrier frequency.

* * * * *